US012272203B2

(12) United States Patent
Casey

(10) Patent No.: US 12,272,203 B2
(45) Date of Patent: *Apr. 8, 2025

(54) GAMING MACHINE

(71) Applicant: Video Gaming Technologies, Inc., Franklin, TN (US)

(72) Inventor: Michael P. Casey, Reno, NV (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,462

(22) Filed: Nov. 9, 2023

(65) Prior Publication Data

US 2024/0078867 A1 Mar. 7, 2024

Related U.S. Application Data

(63) Continuation of application No. 17/892,242, filed on Aug. 22, 2022, now Pat. No. 11,854,340, which is a continuation of application No. 17/142,993, filed on Jan. 6, 2021, now Pat. No. 11,468,731, which is a continuation of application No. 16/544,881, filed on Aug. 19, 2019, now Pat. No. 10,896,569, which is a continuation of application No. 15/658,186, filed on Jul. 24, 2017, now Pat. No. 10,395,478, and a continuation of application No. 15/658,120, filed on Jul. 24, 2017, now Pat. No. 10,395,468, and a (Continued)

(51) Int. Cl.
*G07F 17/32* (2006.01)

(52) U.S. Cl.
CPC ...... *G07F 17/3213* (2013.01); *G07F 17/3209* (2013.01); *G07F 17/3225* (2013.01); *G07F 17/3246* (2013.01); *G07F 17/3251* (2013.01); *G07F 17/3258* (2013.01)

(58) Field of Classification Search
CPC ............ G07F 17/3213; G07F 17/3209; G07F 17/3225; G07F 17/3246; G07F 17/3251; G07F 17/3258
See application file for complete search history.

(56) References Cited

U.S. PATENT DOCUMENTS

| | | | |
|---|---|---|---|
| 7,690,978 | B2 | 4/2010 | Webb |
| 7,695,365 | B2 | 4/2010 | Casey |

(Continued)

OTHER PUBLICATIONS

Australian Examination Report No. 2 issued in App. No. AU2022202654, Jun. 11, 2024, 4 pages.

(Continued)

*Primary Examiner* — Kevin Y Kim
(74) *Attorney, Agent, or Firm* — Armstrong Teasdale LLP

(57) ABSTRACT

A gaming machine including a display that has a first display area and a second display area. The first display area displays a first prize and a second prize. The first prize has a first prize threshold and the second prize has a second prize threshold. The second display area displays an overflow prize, while the game controller contributes to the first prize at least a portion of the credit balance with respect to a wagering activity, and causes the display to display an increment of the overflow prize in response to the first prize having reached the first threshold. A payout mechanism configured to, in response to determining one of the first prize and the second prize is to be awarded, cause a payout associated with the one of the first prize and the second prize to be awarded and the incremented overflow prize.

20 Claims, 25 Drawing Sheets

Related U.S. Application Data continuation of application No. 15/658,159, filed on Jul. 24, 2017, now Pat. No. 10,395,469.

(56) References Cited

U.S. PATENT DOCUMENTS

| | | | |
|---|---|---|---|
| 7,780,519 | B2 | 8/2010 | Gomez |
| 7,874,913 | B2 | 1/2011 | Webb |
| 8,262,459 | B2 | 9/2012 | Mattice |
| 8,360,851 | B2 | 1/2013 | Aoki |
| 8,414,381 | B2 | 4/2013 | Hein |
| 9,355,521 | B2 | 5/2016 | King |
| 9,449,465 | B2 | 9/2016 | Caputo |
| 2002/0045474 | A1 | 4/2002 | Singer |
| 2005/0176492 | A1 | 8/2005 | Pierce |
| 2007/0069460 | A1 | 3/2007 | Hein |
| 2007/0072668 | A1 | 3/2007 | Hein |
| 2007/0218982 | A1 | 9/2007 | Baerlocher |
| 2009/0011826 | A1 | 1/2009 | Acres |
| 2009/0253496 | A1 | 10/2009 | Stevens |
| 2010/0029381 | A1 | 2/2010 | Vancura |
| 2010/0227677 | A1 | 9/2010 | Baerlocher |
| 2011/0065512 | A1 | 3/2011 | Munakata |
| 2011/0081963 | A1 | 4/2011 | Chongolnee |
| 2012/0172106 | A1 | 7/2012 | Caputo |
| 2013/0260865 | A1 | 10/2013 | Kaminkow |
| 2014/0094294 | A1 | 4/2014 | Bennett |
| 2014/0100024 | A1 | 4/2014 | Stevens |
| 2014/0287825 | A1 | 9/2014 | Baerlocher |
| 2015/0065232 | A1 | 3/2015 | Harvey |
| 2015/0213673 | A1 | 7/2015 | Elias |
| 2016/0093172 | A1 | 3/2016 | Kitamura |
| 2016/0155304 | A1 | 6/2016 | Baerlocher |
| 2017/0004674 | A1 | 1/2017 | Caputo |

OTHER PUBLICATIONS

Office Action, dated Aug. 1, 2018, for U.S. Appl. No. 15/658,159, filed Jul. 24, 2017.

Final Office Action, dated Jan. 8, 2019, for U.S. Appl. No. 15/658,159, filed Jul. 24, 2017.

Office Action, dated Jul. 19, 2018, for U.S. Appl. No. 15/658,186, filed Jul. 24, 2017.

Final Office Action, dated Nov. 19, 2018, for U.S. Appl. No. 15/658,186, filed Jul. 24, 2017.

Office Action, dated Sep. 13, 2018, for U.S. Appl. No. 15/658,085, filed Jul. 24, 2017.

Final Office Action, dated Feb. 28, for U.S. Appl. No. 15/658,085, filed Jul. 24, 2017.

Australian Examination Report No. 1 issued in App. No. AU2022202654, Jun. 13, 2023, 2 pages.

Office Action, dated Jul. 6, 2018, for U.S. Appl. No. 15/658,120, filed Jul. 24, 2017.

Final Office Action, dated Jan. 7, 2019, for U.S. Appl. No. 15/658,120, filed Jul. 24, 2017.

Office Action dated Jul. 27, 2020 for U.S. Appl. No. 16/544,881 (pp. 1-6).

Notice of Allowance dated Sep. 17, 2020 for U.S. Appl. No. 16/544,881 (pp. 1-7).

Office Action (Non-Final Rejection) dated Feb. 11, 2022 for U.S. Appl. No. 17/142,993 (pp. 1-5).

Office Action (Notice of Allowance and Fees Due (PTOL-85)) dated May 24, 2022 for U.S. Appl. No. 17/142,993 (pp. 1-8).

Office Action (Non-Final Rejection) dated May 23, 2023 for U.S. Appl. No. 17/892,242 (pp. 1-6).

Office Action (Notice of Allowance and Fees Due (PTOL-85)) dated Aug. 16, 2023 for U.S. Appl. No. 17/892,242 (pp. 1-8).

GAMING MACHINE

RELATED APPLICATIONS

The present application is a continuation of and claims priority to U.S. patent application Ser. No. 17/892,242, filed Aug. 22, 2022, and entitled "Gaming Machine" which is a continuation of U.S. patent application Ser. No. 17/142,993, filed Jan. 6, 2021, and entitled "GAMING MACHINE," which is a continuation of U.S. patent application Ser. No. 16/544,881, filed Aug. 19, 2019, issued on Jan. 19, 2021, as U.S. Pat. No. 10,896,569, and entitled "GAMING MACHINE," which is a continuation of U.S. patent application Ser. No. 15/658,159, filed Jul. 24, 2017, issued on Aug. 27, 2019, as U.S. Pat. No. 10,395,469, and entitled "GAMING MACHINE," and a continuation of U.S. patent application Ser. No. 15/658,120, filed Jul. 24, 2017, issued on Aug. 27, 2019, as U.S. Pat. No. 10,395,468, and entitled "GAMING MACHINE," and a continuation of U.S. patent application Ser. No. 15/658,186, filed Jul. 24, 2017, issued on Aug. 27, 2019, as U.S. Pat. No. 10,395,478, and entitled "GAMING MACHINE," which are hereby incorporated by reference in their entireties.

BACKGROUND

In electronic gaming systems with multilevel progressive jackpots, contributions to the multilevel progressive jackpots are received when wagers are placed. If a progressive jackpot is not won, the progressive jackpot continues to grow until the progressive jackpot is capped. While such gaming systems provide players with enjoyment, a need exists for new gaming systems in order to maintain or increase player enjoyment.

SUMMARY

Incrementable and displayable overflow jackpots in addition to multilevel progressive jackpots offered through a feature wheel improve display of increasing prizes and return larger jackpot prizes to players.

One embodiment provides a gaming machine that includes a credit input mechanism to receive a physical item representing a monetary value for establishing a credit balance, the credit balance being increasable and decreasable based at least on wagering activity. The gaming machine also includes credit meters to monitor the credit balance, and a display having a first display area and a second display area. The gaming machine also includes a game controller configured to, in accord with the wagering activity, cause the display to display a first prize and a second prize in the first display area, wherein the first prize has a first prize threshold and the second prize has a second prize threshold, cause the display to display an overflow prize in the second display area, contribute to the first prize at least a portion of the credit balance with respect to the wagering activity, and cause the display to display an increment of the overflow prize in response to the first prize having reached the first threshold. A payout mechanism, in response to determining one of the first prize and the second prize is to be awarded, increases the credit balance, and causes a payout associated with the one of the first prize and the second prize to be awarded and the incremented overflow prize.

Another embodiment of the disclosure provides a gaming machine that includes a credit input mechanism to receive a physical item representing a monetary value for establishing a credit balance, the credit balance being increasable and decreasable based at least on wagering activity. The gaming machine also includes credit meters to monitor the credit balance, and a display including 1) a first display area displaying a plurality of display positions, 2) a second display area displaying an overflow prize, 3) a third display area displaying a plurality of display slices including a first display slice having a first prize, and a second display slice having a second value, the second display area having an indicator rotating with respect to the first prize and the second prize, wherein the first prize has a first prize threshold and the second prize has a second prize threshold. A game controller, in accord with the wagering activity, selects symbols for display in the display positions, and displays the selected symbols, determine if the displayed symbols include a trigger condition, increments the first prize with at least a portion of the credit balance with respect to the wagering activity, increments the overflow prize in response to the first prize having reached the first threshold, and rotates the indicator with respect to the first slice and the second slice in response to determining that the displayed symbols include a trigger condition, and stops the rotating of the indicator, determines one award of the first prize and the second prize is to be awarded, when the rotating of the indicator stops. A payout mechanism, in response to determining one award of the first prize and the second prize is to be awarded, increases the credit balance, and causes a payout associated with the one award and the incremented overflow prize.

A further embodiment of the disclosure provides a gaming machine that includes a credit input mechanism to receive a physical item representing a monetary value for establishing a credit balance, the credit balance being increasable and decreasable based at least on wagering activity, and credit meters to monitor the credit balance. The gaming machine also includes a display having a first display area, a second display area, and a third display area, and a game controller. The game controller, in accord with the wagering activity, causes the display to display a base game in a first display area, an overflow prize and an indicator in a second display area, and a feature wheel in a third display area rotatable about the overflow prize. The feature wheel has a plurality of prize slices including a first slice and a second slice, each of the prize slices has one of a plurality of prizes including the first slice having a first prize and the second slice having a second prize, wherein the first prize has a first prize threshold and the second prize has a second prize threshold. The game controller also increments the first prize based on the wagering activity, increments the overflow prize in response to the first prize having reached the first threshold, rotates the indicator in response to determining that the displayed symbols include a trigger condition, and stop the rotating of the indicator, and awards a prize identified by the stopping of the feature wheel. A payout mechanism, in response to awarding the identified prize, causes a payout associated with the credit balance based on the identified prize and the incremented overflow prize.

A system, machine, and/or method is provided for upgrading, displaying, and/or revealing a prize and/or progressive jackpot wheel, wherein a feature prize, and/or progressive jackpot, is upgraded and/or displayed via spinning of a feature wheel, substantially as shown in and/or described in connection with at least one of the figures, as set forth more completely in the claims.

These and other advantages, aspects and novel features of the disclosure, as well as details of an illustrated embodiment thereof, will be more fully understood from the following description and drawings.

BRIEF DESCRIPTION OF THE DRAWINGS

Embodiments of the disclosure will now be described with reference to the accompanying drawings in which.

DETAILED DESCRIPTION

Figure 1:
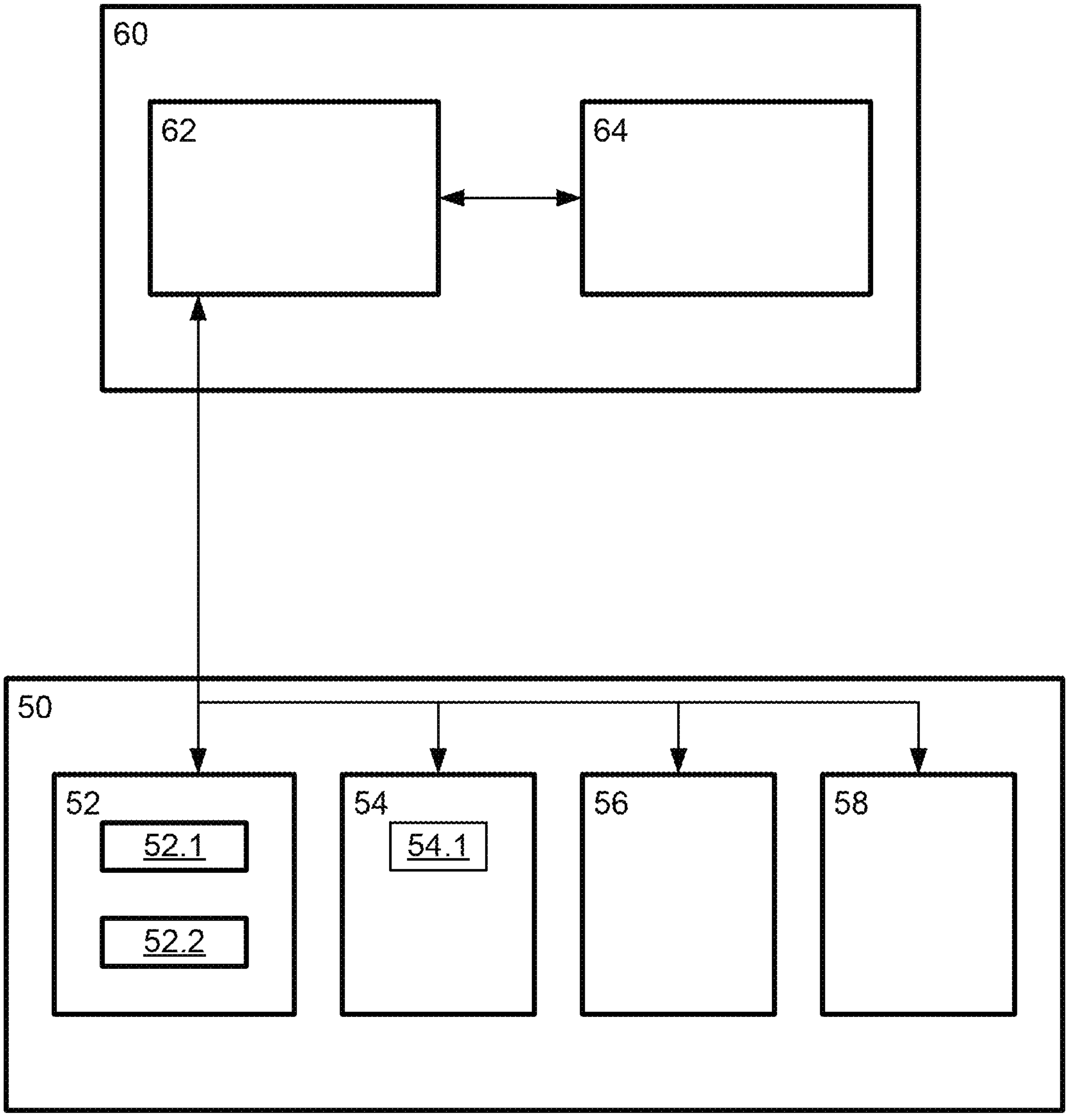
FIG. 1 is a block diagram of the core components of a gaming system.

Referring to the drawings, there is shown an embodiment of a gaming machine that includes a credit input mechanism to receive a physical item representing a monetary value for establishing a credit balance, the credit balance being increasable and decreasable based at least on wagering activity. The gaming machine also includes credit meters to monitor the credit balance, and a display including 1) a first display area that includes a plurality of display positions, and 2) a second display area having a plurality of display slices and an indicator. A first display slice of the display slices displays a first prize identifier associated with a first value. A second display slice of the display slices displays a second prize identifier associated with a second value that is greater than the first value. A third display slice of the display slices displays an upgrade identifier. The gaming machine also includes a memory storing a plurality of symbols, and a game controller. The game controller, in accord with the established credit balance, selects symbols for display in the display positions, and displays the selected symbols at the display positions. The game controller determines if the displayed symbols include a trigger condition, and if so, rotates the indicator and stops the rotating of the indicator. The game controller determines one award of the first prize identifier, the second prize identifier, and the upgrade identifier is to be awarded, when the rotating of the indicator stops. The game controller changes the first value associated the first display slice to the second value, in response to determining the one award includes the upgrade identifier. The gaming machine also includes a payout mechanism to, in response to determining one of the first prize identifier and the second prize identifier is to be awarded, increase the credit balance based on one of the first value and the second value, and to cause a payout associated with the credit balance.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Referring to FIG. 1, the gaming system 1 has several core components. At the broadest level, the core components are a player interface 50 and a game controller 60. The player interface 50 enables manual interaction between a player and gaming system 1, and for this purpose includes input/output components required for the player to enter instructions to play a game and observe game outcomes.

Components of the player interface may vary from embodiment to embodiment but will typically include a credit mechanism 52 to enable a player to input credits. For example, in some embodiments, credit mechanism 52 may include a credit input mechanism 52.1 to receive a physical item representing a monetary value for establishing a credit balance. The credit balance may be increasable and decreasable based on wagering activities. Based on the established credit balance, the gaming system 1 initiates a game. In some embodiments, the credit mechanism 52 also includes a payout mechanism 52.2 to cause a payout associated with the credit balance. The player interface may also include one or more displays 54, a game play mechanism 56 including one or more input devices that enable a player to input game play instructions (e.g. to place a wager), and one or more speakers 58. In some embodiments, each of the displays 54 includes a plurality of display positions. In other embodiments, each of the displays 54 includes a plurality of display areas. Each of the display areas includes a plurality of display positions. In the embodiment shown, the display 54 also includes a credit meter 54.1. In some embodiments, credit meter 54.1 displays credits available, credits bet, and/or credits won.

Game controller 60 is in data communication with player interface 50 and typically includes a processor 62 that processes game play instructions in accordance with game play rules and outputs game play outcomes to the display(s) 54. Typically, the game play rules are stored as program code in a memory 64 but can also be hardwired. In some embodiments, the memory 64 may also store data indicative of a plurality of symbols, pay tables, images, and other information to be used in games. Herein the term "processor" is used to refer generically to any device that can process game play instructions in accordance with game play rules and may include: a microprocessor, microcontroller, programmable logic device or other computational device, a general purpose computer (e.g. a PC) or a server. That is, a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using an application specific integrated circuit (ASIC) or a field programmable gate array (FPGA).

Figure 2:
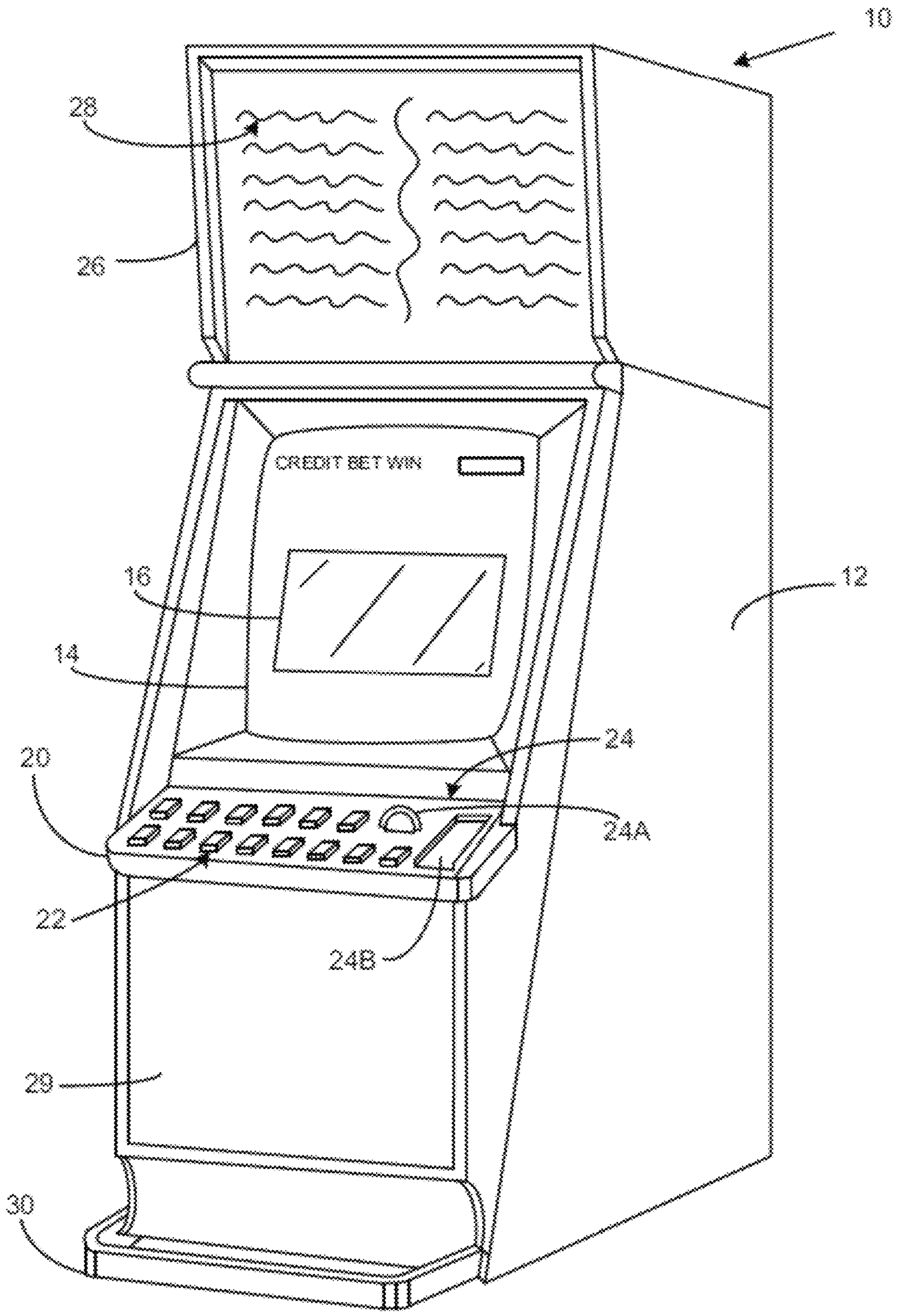
FIG. 2 is a perspective view of a standalone gaming machine.

Referring to FIG. 2, a gaming system in the form of a standalone gaming machine 10 includes a console 12 having a display 14 on which are displayed representations of a game 16 that can be played by a player. Mid-trim 20 of the gaming machine 10 houses a bank of buttons 22 for enabling a player to interact with the gaming machine, in particular during game play. The mid-trim 20 also houses a credit input mechanism 24 (similar to credit input mechanism 52.1 of FIG. 1) which in this example includes a coin input chute 24A and a bill collector 24B. Other credit input mechanisms may also be employed, for example, a card reader for reading a smart card, debit card or credit card. Other gaming machines may be configured to accept a ticket such that the credit input mechanism 24 may have a ticket reader (not shown) for reading tickets having a value and crediting the player based on the face value of the ticket. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

As shown in FIG. 2, a top box 26 may carry artwork 28, including for example pay tables and details of bonus awards and other information or images relating to the game. Further artwork and/or information may be provided on a front panel 29 of the console 12. Gaming machine 10 also includes a payout mechanism in the form of a coin tray 30 that is mounted beneath front panel 29 for dispensing cash payouts from gaming machine 10. Another form of a payout mechanism may include an embedded printer to print out a payout ticket associated with the credit balance that may be redeemed at a cage (not shown).

Display 14 shown in FIG. 2 is in the form of a liquid crystal display. Alternatively, display 14 may be a light emitting diode display, plasma screen, and/or any other suitable video display unit. Top box 26 may also include a display, for example a video display unit, which may be of the same type as display 14, or of a different type.

Figure 3:
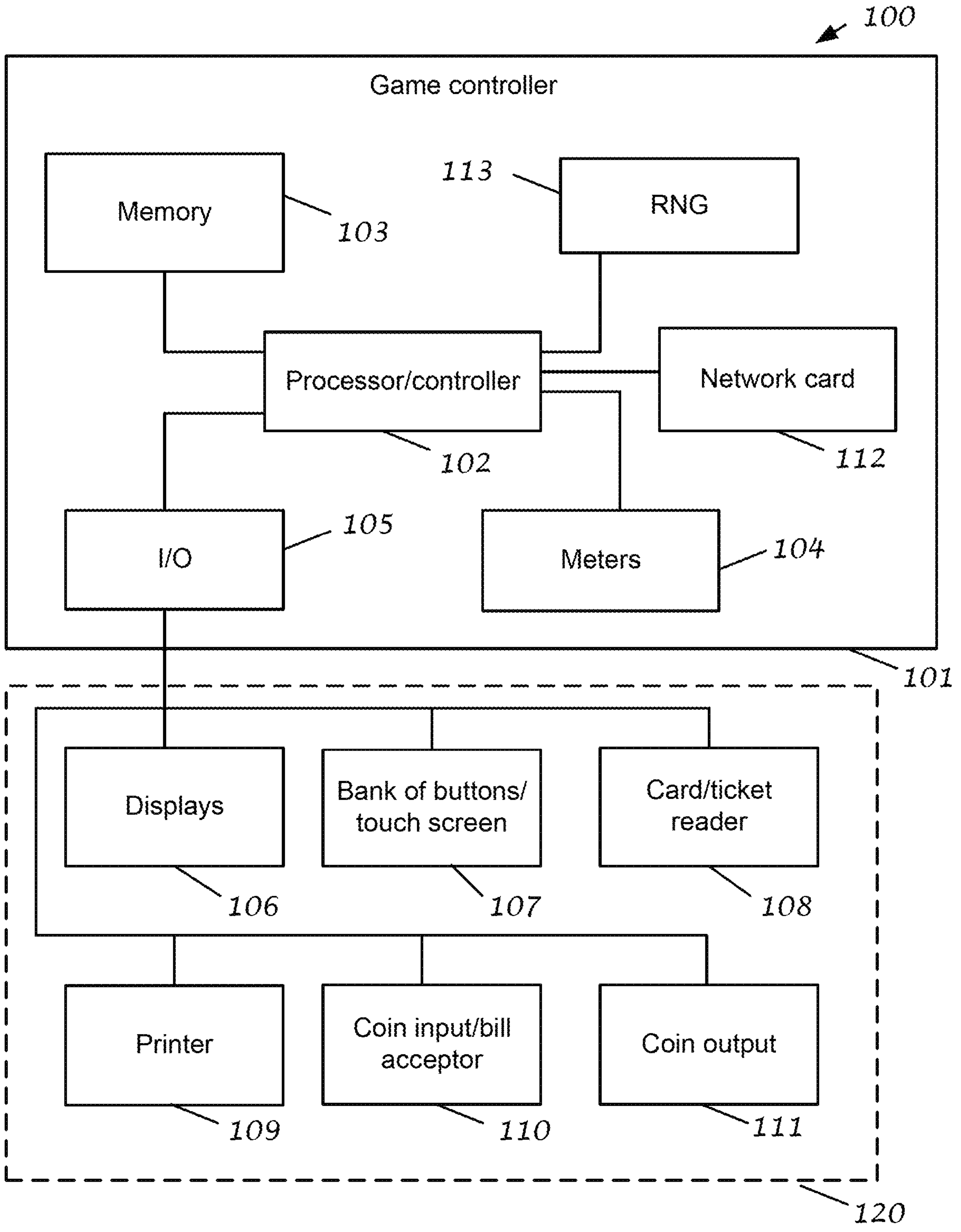
FIG. 3 is a block diagram of the functional components of a gaming machine.

FIG. 3 shows a block diagram of operative components of a typical gaming machine which may be the same as or different to the gaming machine of FIG. 2.

As shown in FIG. 3, a gaming machine 100 includes a game controller 101 having a processor 102 mounted on a circuit board. Instructions and data to control operation of processor 102 are stored in a memory 103, which is in data communication with the processor 102. Typically, gaming machine 100 will include both volatile and non-volatile memory and more than one of each type of memory, with such memories being collectively represented by the memory 103.

Gaming machine 100 has credit meters 104 for purposes including ensuring regulatory compliance and monitoring player credit, and an input/output (I/O) interface 105 for communicating with peripheral devices of the gaming machine 100. Input/output (I/O) interface 105 and/or the peripheral devices may be intelligent devices with their own memory for storing associated instructions and data for use with the input/output interface or the peripheral devices. A random number generator module 113 generates random numbers for use by processor 102. Persons skilled in the art will appreciate that the reference to random numbers includes pseudo-random numbers.

In the example shown in FIG. 3, a player interface 120 includes peripheral devices that communicate with game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game, any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, gaming machine 100 may include a communications interface, for example a network card 112. Network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
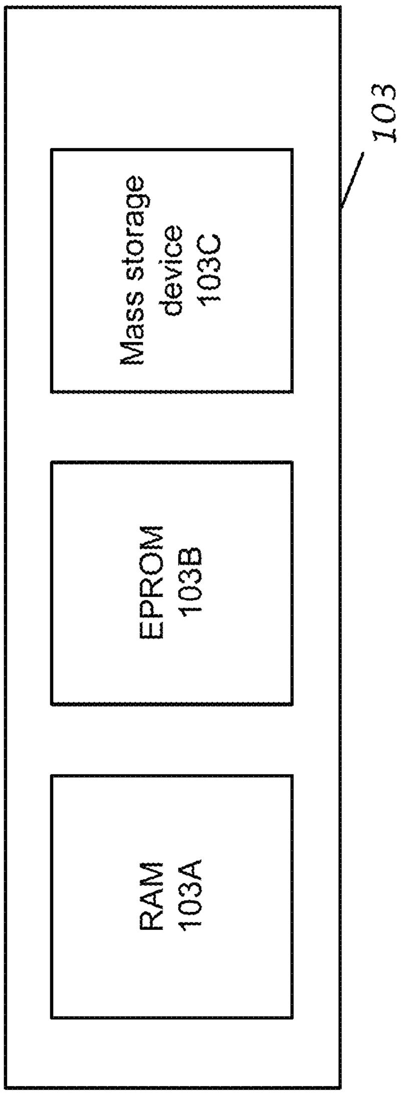
FIG. 4 is a schematic diagram of the functional components of a memory.

Referring now to FIG. 4, the main components of an exemplary memory 103 include RAM 103A, EPROM 103B and a mass storage device 103C. RAM 103A typically temporarily holds program files for execution by processor 102 and related data. EPROM 103B may be a boot ROM device and/or may contain some system or game related code. Mass storage device 103C is typically used to store game programs, the integrity of which may be verified and/or authenticated by the processor 102 using protected code from EPROM 103B or elsewhere.

It is also possible for the operative components of gaming machine 100 to be distributed, for example, input/output devices 106, 107, 108, 109, 110, 111 may be provided remotely from the game controller 101.

Figure 5:
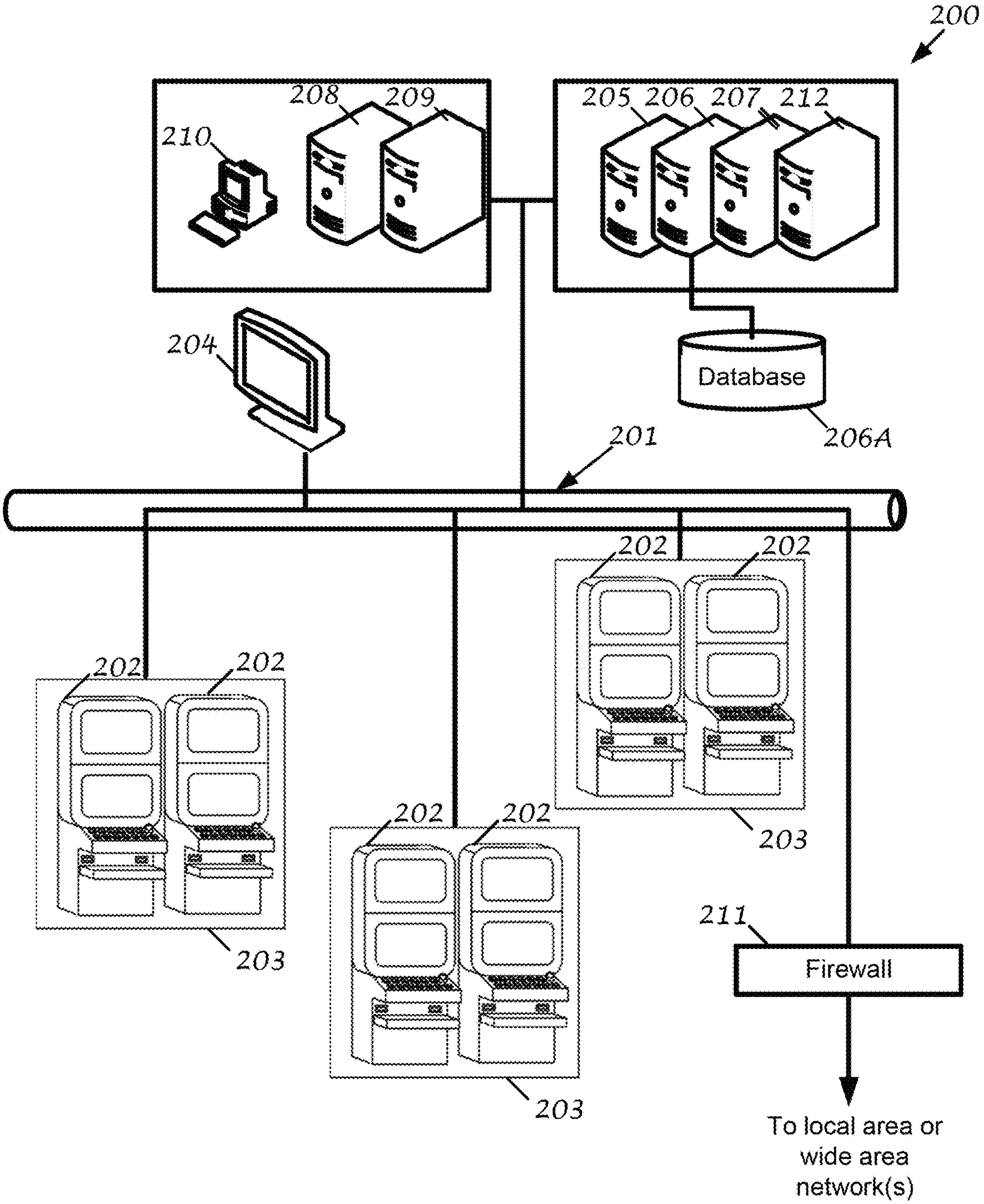
FIG. 5 is a schematic diagram of a network gaming system.

FIG. 5 shows a gaming system 200 in accordance with an alternative embodiment. Gaming system 200 includes a network 201, which for example may be an Ethernet network. Gaming machines 202, shown arranged in three banks 203 of two gaming machines 202 in FIG. 5 are connected to network 201. Gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to network 201. For example, displays 204 may be associated with one or more banks 203 of gaming machines. Displays 204 may be used to display representations associated with game play on gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by gaming machines 202 in a database 206A. Typically, if the gaming system enables players to participate in a jackpot game, a jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming system 200, including for example a gaming floor management server 208, and a licensing server 209 to monitor the use of licenses relating to particular games. An administrator terminal 210 is provided to allow an administrator to run network 201 and the devices connected to the network.

Gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

When the credit input mechanism 52.1 (of FIG. 1) has received a physical item representing a monetary value, a credit balance is established. The player may then operate the game play mechanism 56 (of FIG. 1) to specify one or more of a plurality of wagers for the base game and to initiate a play of the base game. In an exemplary embodiment, at least certain of the wagers that the player can wager entitles the player to win a chance to play a feature game, for example, when a trigger condition occurs. In some embodiments, when the credit input mechanism 52.1 (of FIG. 1) has received a physical item representing a monetary value for establishing a credit balance, at least a portion of the received physical item may initiate a play of the base game directly.

Figure 6:
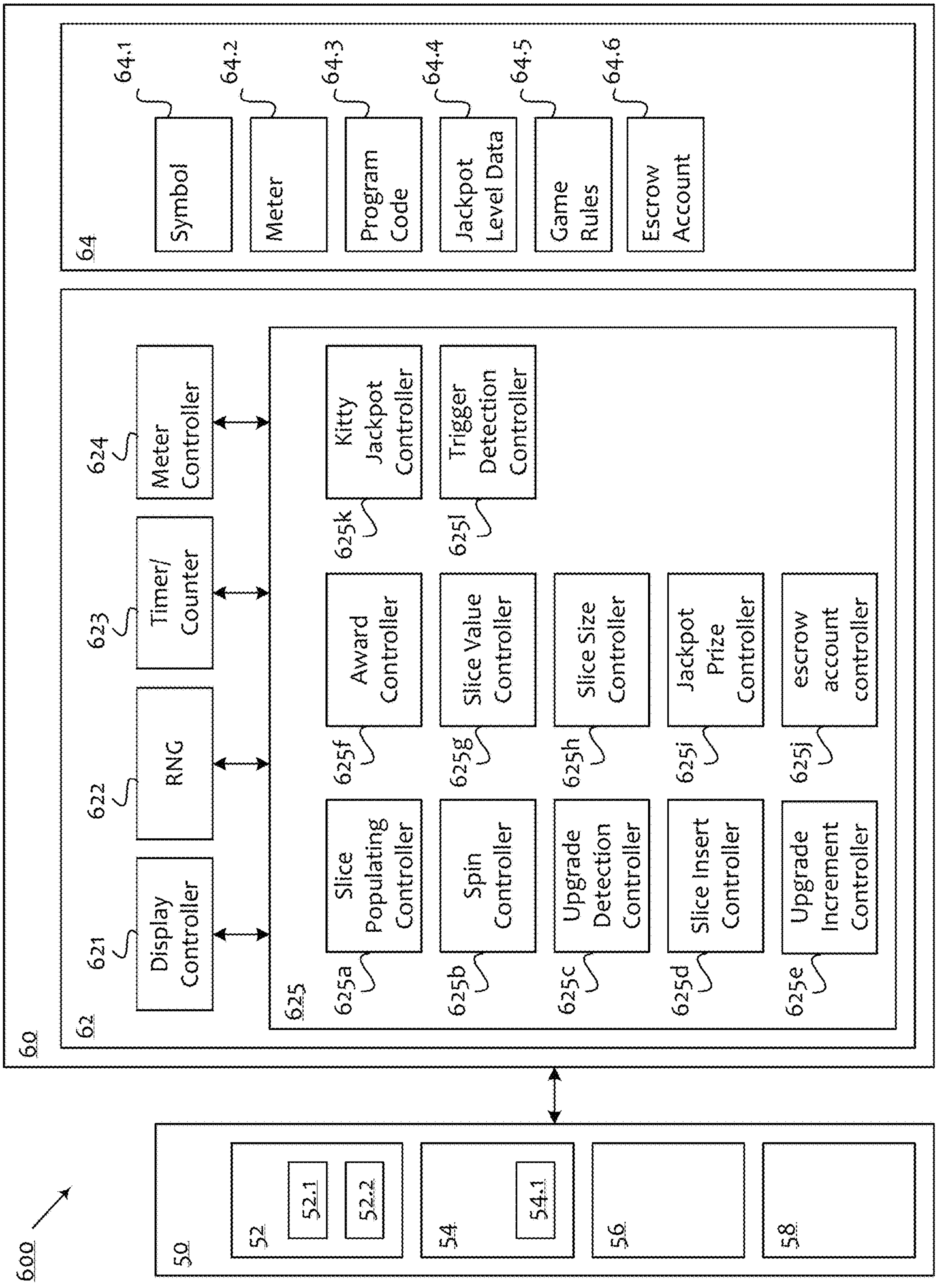
FIG. 6 is a further block diagram of a gaming system.

Referring to FIG. 6, a gaming machine 600 (similar to the gaming machine 10 of FIG. 2) includes a game controller 60. Game controller 60 includes a processor 62 and a memory 64. Memory 64 includes a symbol memory module 64.1 that stores data of a plurality of symbols, a meter memory module 64.2 that stores meter data of gaming machine 600, and a program code memory 64.3 that stores program code to implement a number of modules to be executed by processor 62. In the embodiment described, memory 64 also includes a jackpot level data memory module 64.4 that stores jackpot level data that specifies a plurality of jackpot prizes. In the embodiment, memory 64 also includes a game rule memory module 64.5 that stores a plurality of game rules.

Persons skilled in the art will appreciate that some or all of the components of the game controller 60 could be alternatively implemented. For example, in some embodiments, the game controller 60 and its components are implemented in the form of a dedicated circuit, or an individual application-specific-integrated-circuit (ASIC). In other embodiments, game controller 60 and its components is implemented as an individual ASIC. In other embodiments, some or all of the game controller components may be individually or collectively implemented as software modules, controllers, and/or circuitries.

In the embodiment, processor 62 includes a display controller 621 which is configured to control display 54, a random number generator (RNG) 622 configured to generate a random number, and a timer/counter 623 configured to time and/or count an amount of time and/or a number of games that a base game and/or feature game has been played, for example, without a win, an upgrade, and/or a trigger event. Processor 62 also includes an optional meter controller 624 configured to generate meter data, for example, for display or storage based on game play, and/or to read meter data from the meter memory 64.2.

Figure 7A:
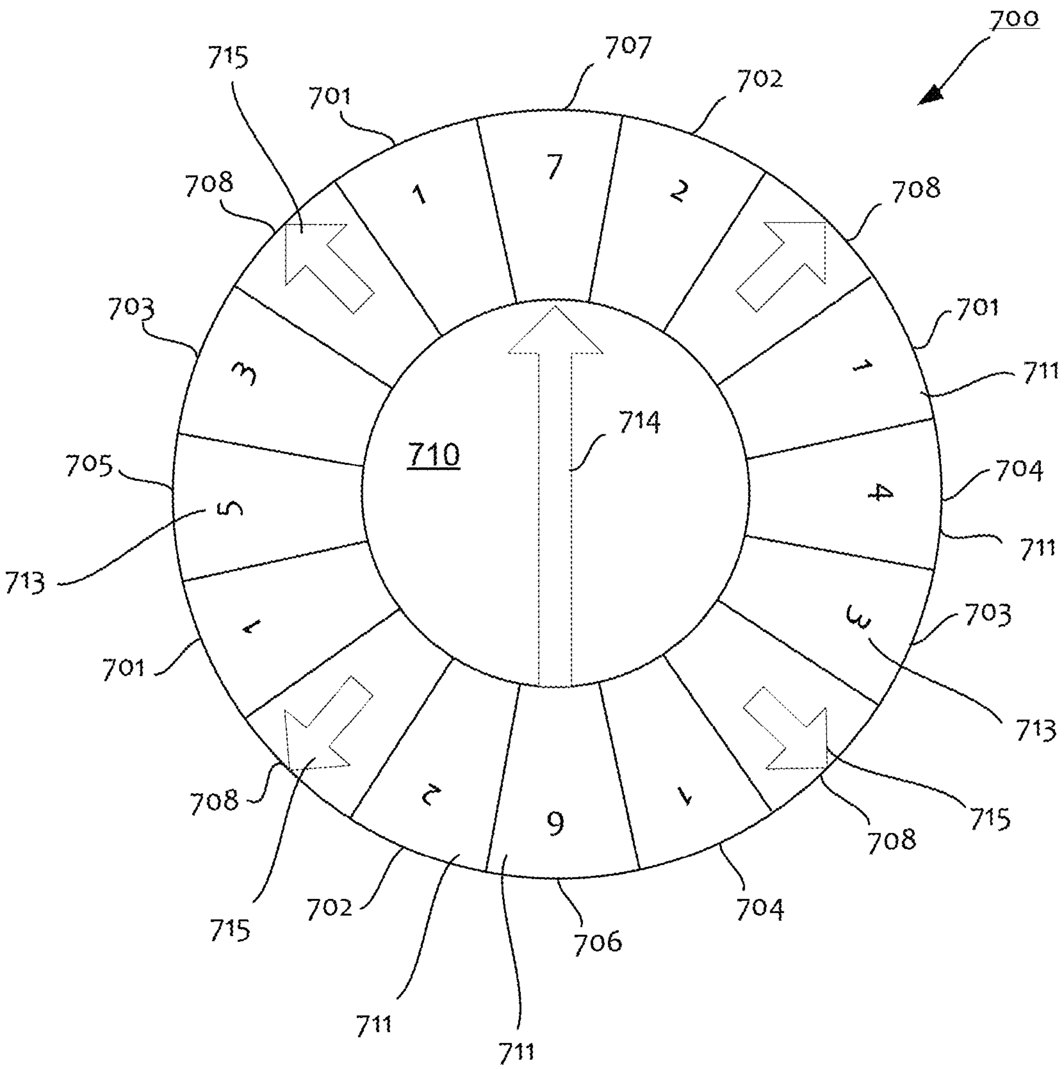
FIG. 7A illustrates a feature wheel having a plurality of slices.

Processor 62 also includes a feature wheel controller 625 that communicates with display controller 621, RNG 622, timer/counter 623, and meter controller 624. In the embodiment shown, feature wheel controller 625 includes a slice populating controller **625*a* configured to populate a feature wheel having a plurality of jackpot slices. For example, in some embodiments, as shown in FIG. 7A, slice populating controller 625*a* populates a feature wheel with sixteen jackpot slices 711. Some of the slices 711 have respective jackpot prize identifiers 713, while other jackpot slices have upgrade identifiers 715, detailed hereinafter. In some embodiments, jackpot prize identifiers 713** may identify a plurality of tiers or levels of progressive jackpot prizes to be awarded. In such embodiments, a first level of progressive jackpot prizes may be associated with the lowest progressive jackpot prizes or value available, whereas a second level of progressive jackpot prizes may be associated the second lowest progressive jackpot prizes available, but greater in value than the progressive jackpot prize associated with level 1. For example, level 1 is associated with a $25 progressive jackpot prize, whereas level 2 is associated with a $50 progressive jackpot prize. In other embodiments, the jackpot prize identifiers may directly identify a plurality of jackpot values or prizes. In still other embodiments, the jackpot prize identifiers may directly identify a plurality of multipliers.

Processor 62 also includes a spin controller **625*b* that controls how a feature wheel is spun. For example, the spin controller 625*b*** controls a speed at which a feature wheel is spun.

The processor 62 also includes an upgrade detection controller **625*c* that detects or determines if an upgrade condition has been met. For example, an upgrade condition is met when a feature wheel 700 has landed on an upgrade slice 708. For another example, the upgrade condition may include a symbol combination or an upgrade symbol displayed in a base game on display 54**.

Processor 62 also includes a slice insert controller **625*d* that controls display 54 to insert a slice into feature wheel 700. For example, in some embodiments, when feature wheel 700 is displayed, a plurality of slices 711 of the feature wheel are initially displayed on display 54. In such cases, when a trigger condition is met, slice insert controller 625*d* inserts an additional slice 711 onto the feature wheel 700. For example, when slices 711 of feature wheel 700 are initially displayed, the displayed slices include lower level prize identifiers. In some embodiments, when a trigger condition is met, the slice insert controller 625*d* may insert an additional slice having a high level prize identifier to the feature wheel. In such cases, if a feature wheel presently displays prize identifiers of level 1 through level 8, and a plurality of upgrade identifiers 715, the slice insert controller 625*d* inserts an additional slice with a prize identifier of level 9 onto the feature wheel 700. In other embodiments, when a trigger condition is met, the slice insert controller 625*d* may update slices having high level prize identifier to the feature wheel. For example, if a feature wheel presently displays prize identifiers of level 1 through level 8, and a plurality of upgrade identifiers 715, the slice controller 625*d* changes slice values to display prize identifiers of level 2 through level 9 onto the feature wheel 700. In the embodiment shown in FIG. 7A, the feature wheel 700 includes a total of 17 slices after the insertion. In other embodiments, when a feature wheel displays prize identifiers of level 1 through level 8 and a plurality of upgrade identifiers 715, the slice insert controller 625*d* inserts an additional slice with a prize identifier of level 9 onto the feature wheel 700 while removing a slice, for example, of level 1, thus keeping a total number of slices to 16. In still other embodiments, for example, when a feature wheel only displays prize identifiers of level 1 through level 8, the slice insert controller 625*d* may insert an additional slice with an upgrade identifier onto the feature wheel 700**.

Processor 62 also includes an upgrade increment controller **625*e* that detects or determines an amount of increment to be added to a prize identifier 713 on a slice 711 of a feature wheel. For example, if prize identifier 713 on a slice 711 is a tier or level indicator, upgrade increment controller 625*e* may increment a value associated with the prize identifier by a next available or upgradeable tier, such as, increment from tier 1 to tier 2. In some embodiments, the upgrade increment controller 625*e* may increment a value associated with the prize identifier by a next available or upgradeable tier multiple times. For example, when the feature wheel has landed on the upgrade slice 708, and after the prize identifier has been upgraded, the spin controller 625*b* may perform an additional spin. In such cases, the feature game ends when a non-upgrade slice is awarded. In other embodiments, the upgrade increment controller 625*e* may increment a value associated with prize identifier 713 by multiple tiers, such as, increment from tier 1 to tier 3. For another example, if prize identifier 713 on a slice 711 is a multiplier, upgrade increment controller 625*e* may increment the multiplier to a next available or upgradeable level of multipliers, such as, increment from a "×2" multiplier to a "×3" multiplier. In other embodiments, the upgrade increment controller 625*e* may increment the prize identifier by multiple levels of multipliers, such as, increment from a "×2" multiplier to a "×4" multiplier. When upgrade increment controller 625*e* has determined an increment amount, the processor 62 causes display 54 to display an upgrade to be applied to a prize identifier 713 on a slice 711 of a feature wheel 700** with the increment.

Processor 62 also includes an award controller **625*f* that awards a jackpot prize when feature wheel 700 has landed on a slice 711 having a prize identifier 713. For example, after spin controller 625*b* has spun feature wheel 700 or an upgrade indicator 714 for a period of time, spin controller 625*b* stops spinning the feature wheel 700 or the upgrade indicator 714 such that the upgrade indicator 714 points to a slice 711 that has stopped. Thus, feature wheel 700 or the upgrade indicator 714 has "landed" on a slice 711. In some embodiments, after spin controller 625*b* stops spinning feature wheel 700 or the upgrade indicator 714, the feature wheel 700 or the upgrade indicator 714 lands on a slice 711 with a prize identifier 713 identifying a tier 8 jackpot prize, the award controller 625*f* may provide an award based on the tier 8 jackpot prize via the payout mechanism 52.2. In other embodiments, when feature wheel 700 or the upgrade indicator 714 lands on a slice 711 with an upgrade identifier 715 as detected by upgrade detection controller 625*c*, award controller 625*f* may upgrade one or more prize identifiers on feature wheel 700 via the upgrade increment controller 625*e***.

Referring back to FIG. 6, processor 62 also includes a slice value controller **625*g* that controls values of the prize identifiers 713 in accordance with upgrade increment controller 625*e*. For example, slice value controller 625*g* may cap the value of a particular prize identifier 713, based on game rules stored in game rule memory module 64.5. In some embodiments, when the game rules specify that no increment is to be applied to a top tier prize identifier, slice value controller 625g ensures that only lower level prize identifiers 713 are incremented while keeping the top tier prize identifier unchanged. In some embodiments, bet options may affect prize identifiers 713 and upgrade identifiers 713 on feature wheel 700, and also may control a player's chances of getting a higher jackpot. When a progressive jackpot prize has been awarded, slice populating controller 625***a* re-populates feature wheel 700 with the original sixteen jackpot slices. Alternatively, slice value controller 625*g* resets prize identifiers 713 to their initial tier numbers and upgrade identifiers to their original arrow placement.

Referring to FIG. 7A, feature wheel 700 has a plurality of slices 701, 702, 703, 704, 705, 706, 707, 708, which together are rotatable about a hub 710 having an upgrade indicator 714. As shown, upgrade indicator 714 points to a level 7 slice 707. The prize identifier of 7 is shown as the number "7" and indicates a tier 7 jackpot prize. As such, award controller 625*f* awards the jackpot prize associated with tier 7. In the embodiment shown, feature wheel 700 has five tier 1 slices 701, three tier 2 slices 702, two tier 3 slices 703, one tier 4 slice 704, one tier 5 slice 705, one tier 6 slice 706, one tier 7 slice 707, and four upgrade slices 708. Thus, feature wheel 700 includes prize identifiers from tier 1 through tier 7 initially representing all of progressive jackpot prizes.

Figure 7B:
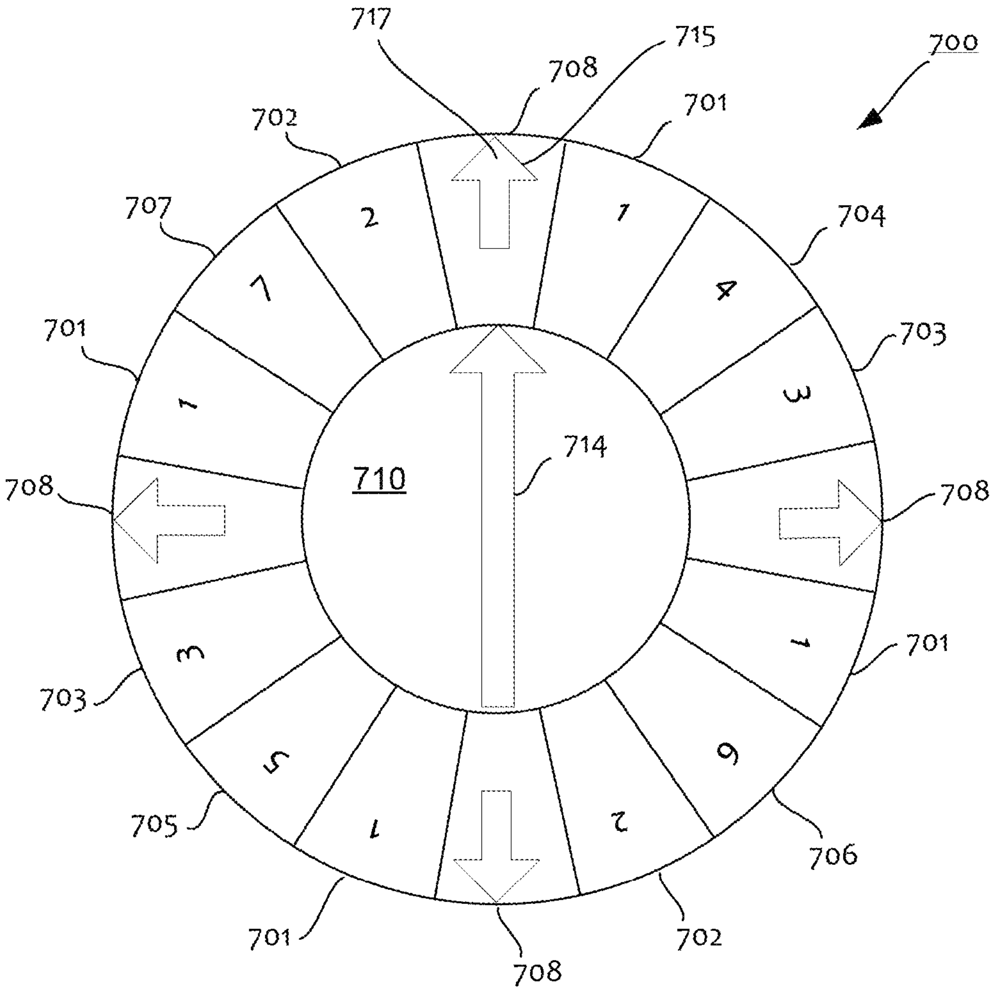
FIG. 7B illustrates the feature wheel of FIG. 7A landing on a slice having an upgraded identifier.
Figure 7C:
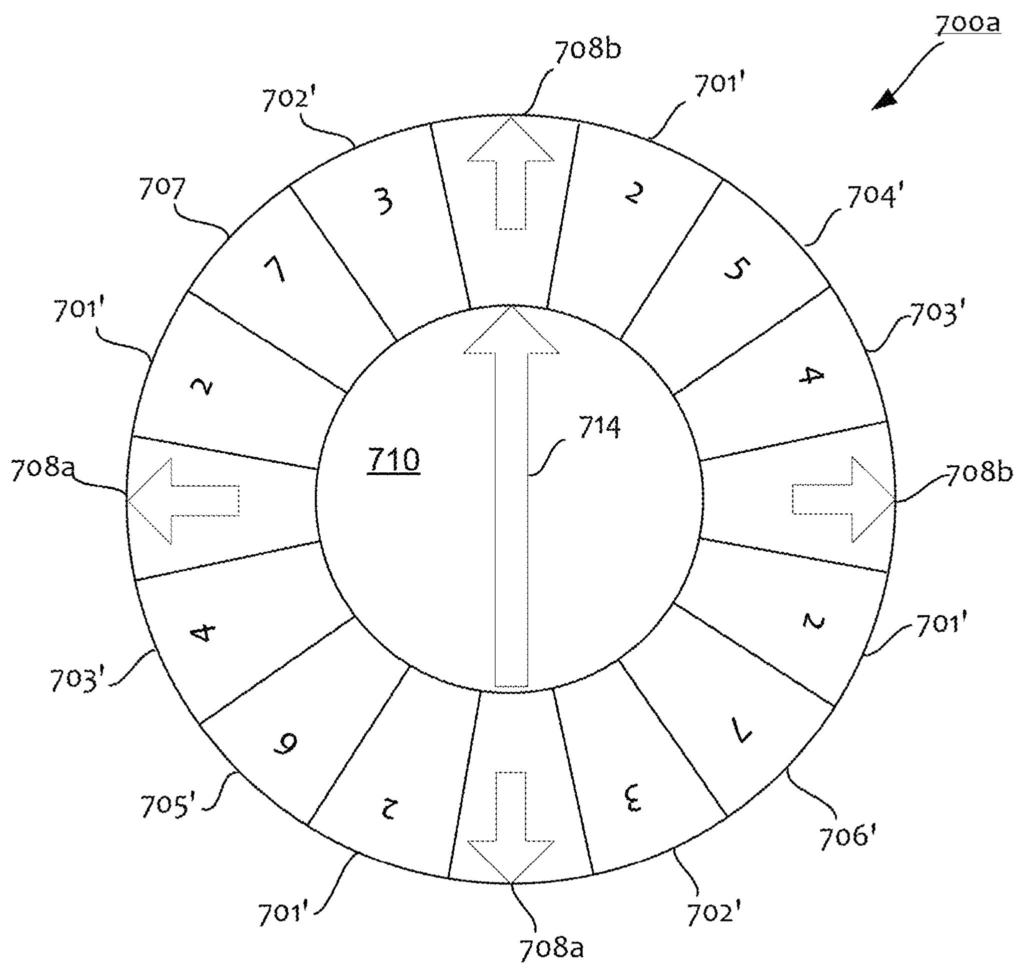
FIG. 7C illustrates an upgraded feature wheel.

Referring to FIG. 7B, feature wheel 700 is shown to have landed on slice 708 having an upgrade identifier 715. Upgrade identifier 715 includes an arrow shaped indicator 717. In response, upgrade increment controller 625*e* may determine an increment of one tier. As such, slice value controller 625*g* may determine that all prize identifiers 713 associated with slices 701, 702, 703, 704, 705, 706 are upgraded by the increment determined by upgrade increment controller 625*e*, while keeping upgrade identifier 715 of slice 707 the same, that is, keeping the indicator 717. Referring to FIG. 7C, an upgraded feature wheel 700*a* has been upgraded from the feature wheel 700. As shown, upgraded feature wheel 700*a* has an upgraded slice 701', which assumes the prize identifier of slice 702 from slice 701. That is, from slice 701, which is tier 1 before the upgrade, has been upgraded to slice 701', which is now tier 2. As shown, however, slice 707 has not been upgraded. As shown, upgrade feature wheel 700*a* has five tier 2 slices 701', three tier 3 slices 702', two tier 4 slices 703', one tier 5 slice 704', one tier 6 slice 705', two tier 7 slices 706', 707, two upgrade slices 708*a*, and two upgrade slices 708*b*. Thus, upgraded feature wheel 700*a* provides a player with a better chance of winning a top tier jackpot prize.

Figure 7D:
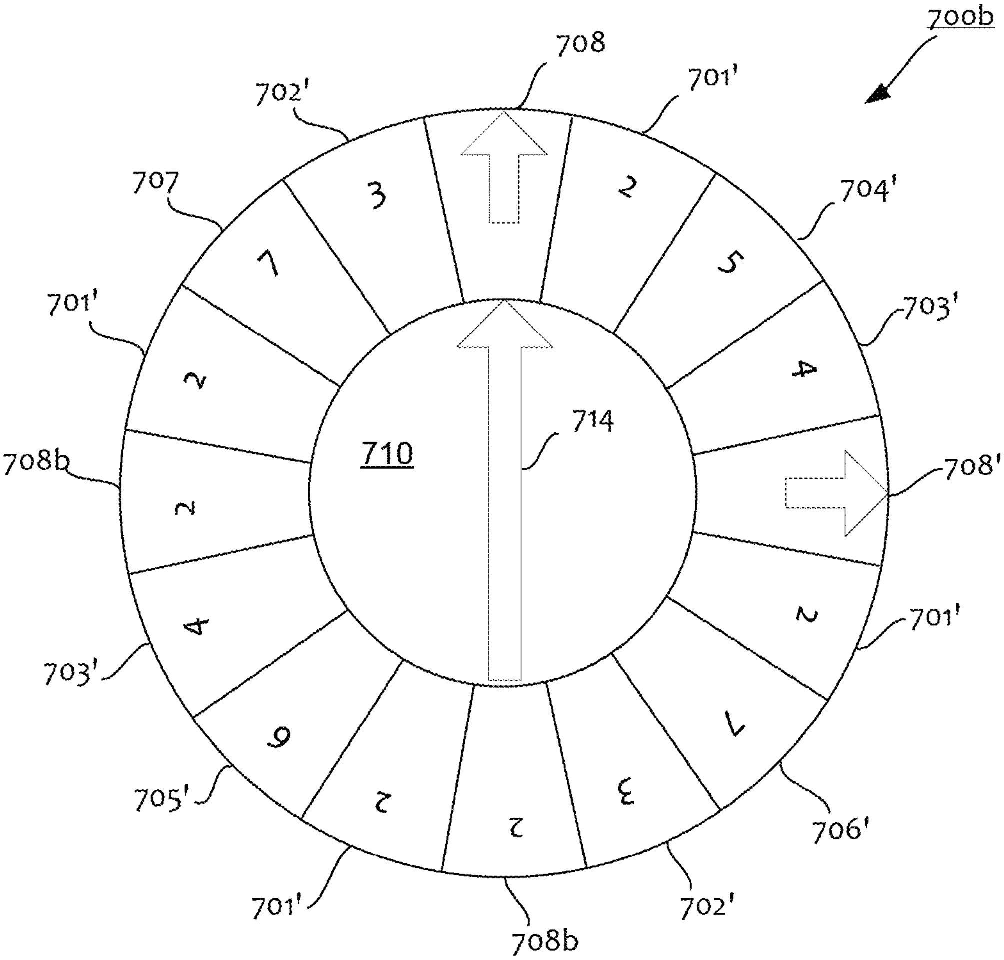
FIG. 7D illustrates a second upgraded feature wheel.
Figure 7E:
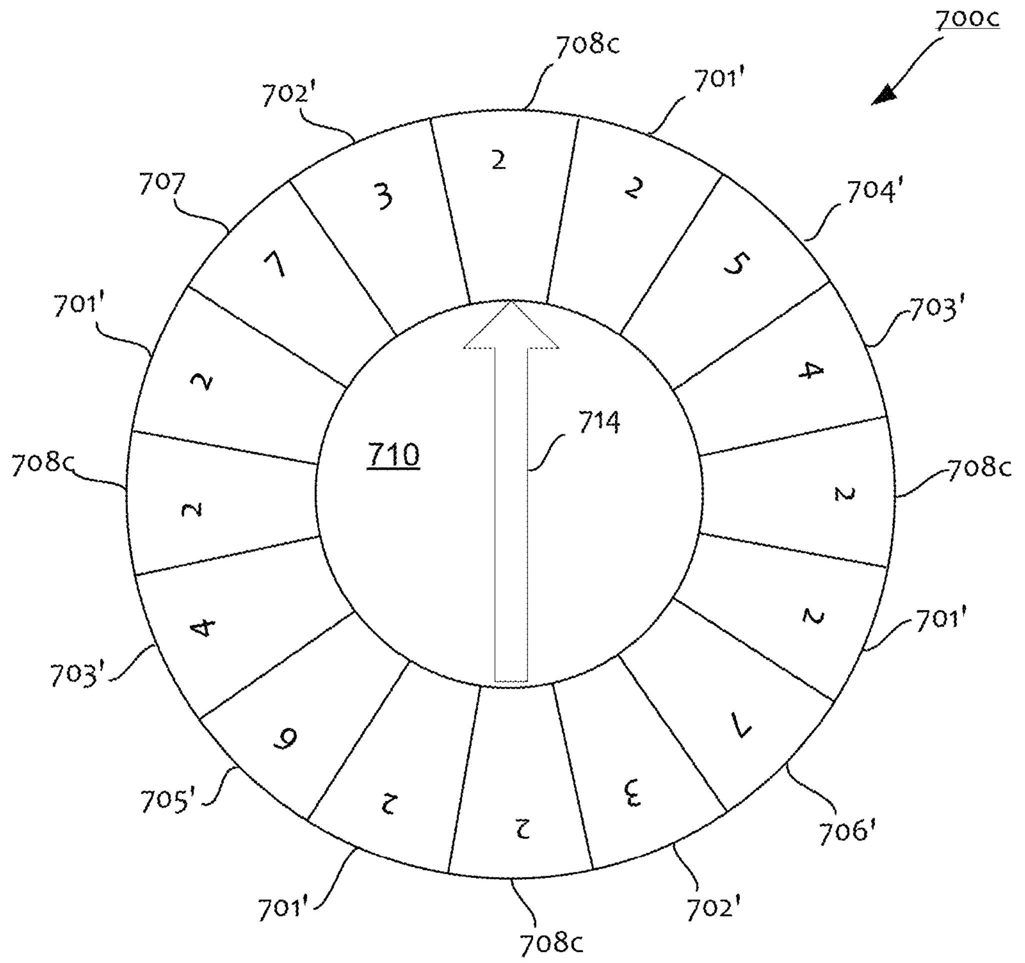
FIG. 7E illustrates a third upgraded feature wheel.

In some embodiments, slice value controller 625*g* also upgrades some of the upgrade slices 708*a*, 708*b* (of FIG. 7C) when the feature wheel 700 has landed on slice 708 having an upgrade identifier 715. As shown in FIG. 7D, a second upgraded feature wheel 700*b* has been further upgraded from the feature wheel 700*a* (of FIG. 7C). As shown, upgraded feature wheel 700*b* includes two additional tier 2 slices 708*b* that have been upgraded from upgrade slices 708*a* (of FIG. 7C). In other embodiments, slice value controller 625*g* upgrades all of the upgrade slices 708*a*, 708*b* (of FIG. 7C) when the feature wheel 700 has landed on slice 708 having an upgrade identifier 715. As shown in FIG. 7E, a third upgraded feature wheel 700*c* has been upgraded from the feature wheel 700*a*. As shown, upgraded feature wheel 700*b* includes four additional tier 2 slices 708*c* that have been upgraded from upgrade slices 708*a*, 708*b* (of FIG. 7C).

Figure 7F:
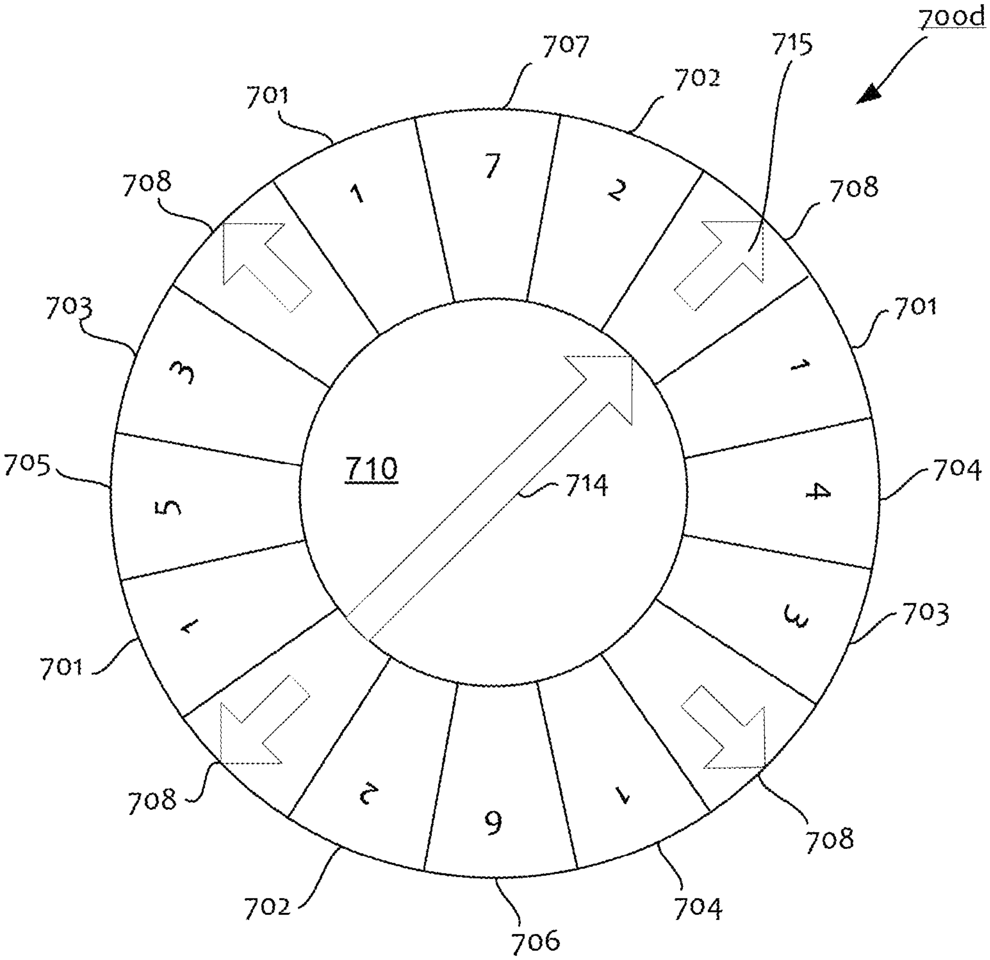
FIG. 7F illustrates a feature wheel with a rotatable upgrade indicator.
Figure 7G:
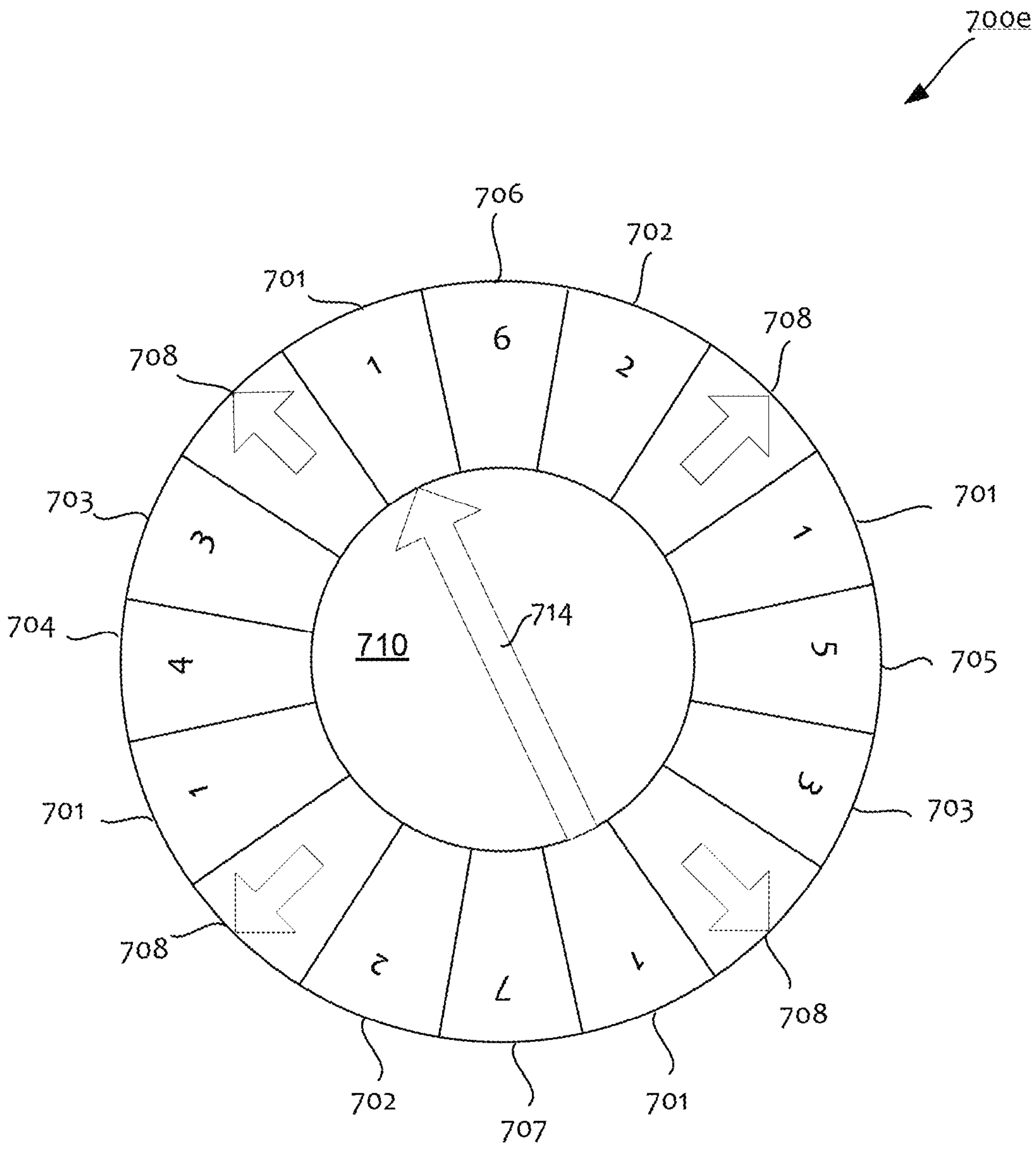
FIG. 7G illustrates a rotatable feature wheel with a rotatable upgrade indicator.

Although the feature wheel 700 (of FIG. 7B) is shown to be rotating about the hub 710 with the upgrade indicator 714 being stationary, the feature wheel 700 may be stationary with respect to the hub 710 with the upgrade indicator 714. For example, referring to FIG. 7F, upgrade indicator 714 rotates with respect to a fourth feature wheel 700*d*, and points to slice 708 having an upgrade identifier 715. In such cases, the slice value controller 625*g* upgrades the feature wheel 700*d* as discussed above. In still other embodiments, while the feature wheel 700 (of FIG. 7B) rotates with respect to the upgrade indicator 714, the upgrade indicator 714 also rotates about the feature wheel 700. In some embodiments, the feature wheel 700 may rotate in a clockwise direction, while the upgrade indicator 714 rotates in a counterclockwise direction. In other embodiments, both the feature wheel 700 and the upgrade indicator 714 rotate in a clockwise direction, but at different rotating speeds. As shown in FIG. 7G, a fourth upgraded feature wheel 700*e* rotates with respect to the upgrade indicator 714, while the upgrade indicator 714 also rotates with respect to the feature wheel 700.

Referring again to FIG. 6, processor 62 also includes a slice size controller 625*h* that controls the displayed sizes of a plurality of slices with respect to respective prize identifiers 713. For example, when a prize identifier 713 has a relatively small value, slice size controller 625*h* controls the corresponding slice 711 to have a relatively small size. Conversely, when the prize identifier 713 has a relatively large value, slice size controller 625*h* controls the corresponding slice 711 to have a relatively large size. In some embodiments, sizes of slices 711 are planar or 2-dimensional. In such cases, a slice having a first prize identifier may have a first slice area, and a slice having a second prize identifier may have a second slice area that is larger than the first slice area when the second prize identifier has a larger associated value than that of the first prize identifier. In other embodiments, sizes of slices 711 are volumetric or 3-dimensional. In such cases, a slice having a first prize identifier may have a first slice volume, and a slice having a second prize identifier may have a second slice volume that is larger than the first slice volume when the second prize identifier has a larger associated value than that of the first prize identifier. Similarly, sizes of slices 711 are linear. In such cases, a slice having a first prize identifier may have a first slice width or length, and a slice having a second prize identifier may have a second slice width or length that is larger than the first slice width or length when the second prize identifier has a wider or longer associated value than that of the first prize identifier.

Figure 8A:
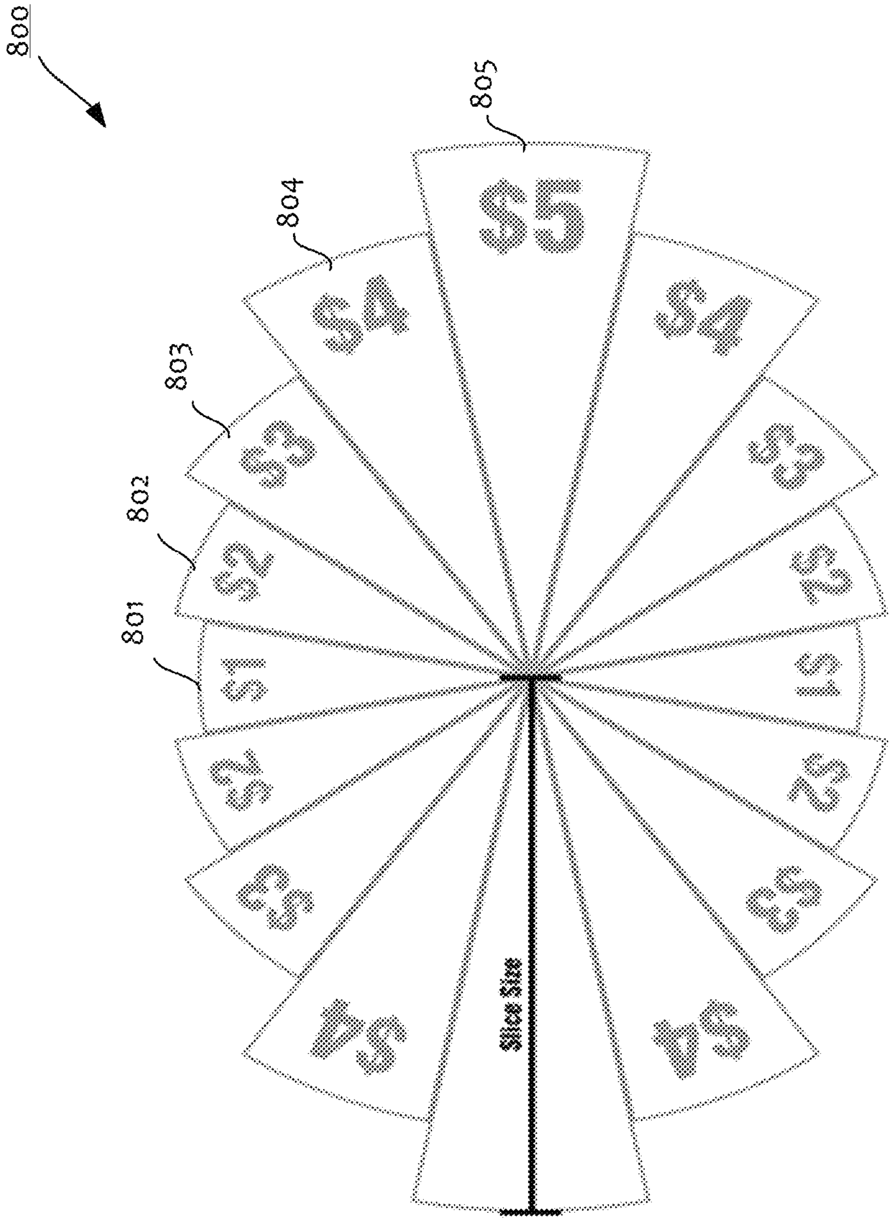
FIG. 8A illustrates a first feature wheel having a plurality of slices with different sizes.

FIG. 8A illustrates a first feature wheel 800 having a plurality of slices 801, 802, 803, 804, 805 to visually convey prize sizes or values associated the slices 801, 802, 803, 804, 805. In the embodiment shown, the slices are planar or 2-dimensional wedges measured by areas (or radius). Specifically, the higher the prize value, the larger the area of the slice. As shown, slice 805 has an associated prize of $5, and slice 804 has an associated prize of $4. As such, the slice size controller 625*h* controls the slice 805 to be shown larger than the slice 804.

Figure 8B:
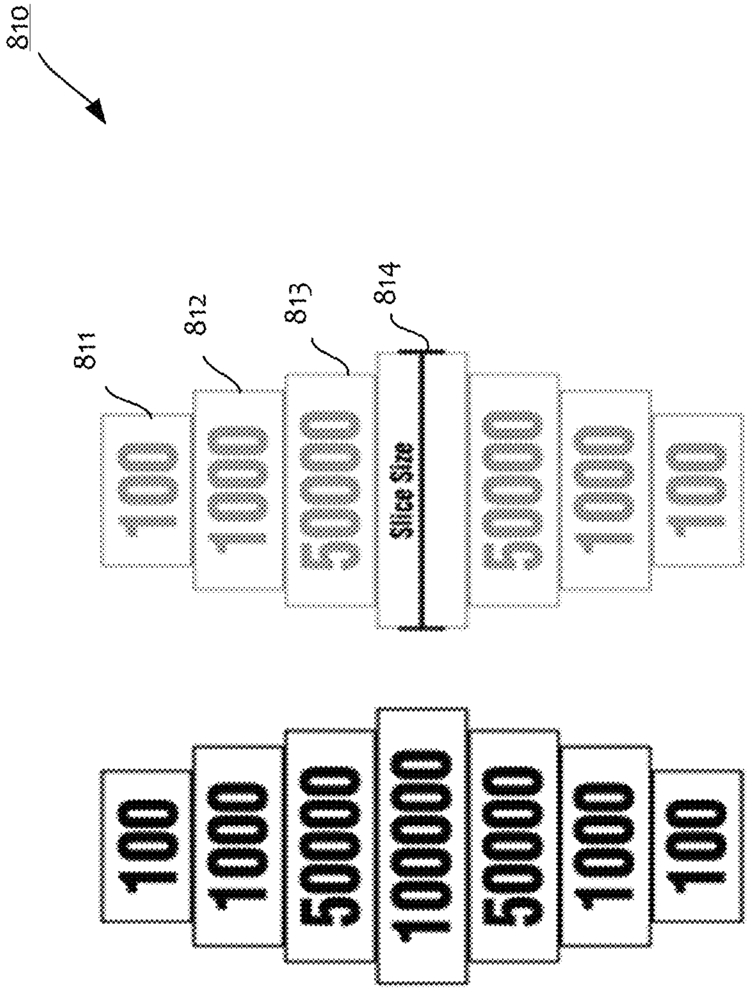
FIG. 8B illustrates a vertical wheel having a plurality of slices with different widths.

FIG. 8B illustrates a vertical wheel 810 having a plurality of slices 811, 812, 813, 814 to visually convey prize sizes or values associated the slices 811, 812, 813, 814. In the embodiment shown, the slices are planar or 2-dimensional rectangles measured by widths. As shown, the higher the prize value, the wider the slice. As shown, slice 814 has an associated prize of 100000, and slice 813 has an associated prize of 50000. As such, the slice size controller 625*h* controls the slice 814 to be shown larger than the slice 813.

Figure 8C:
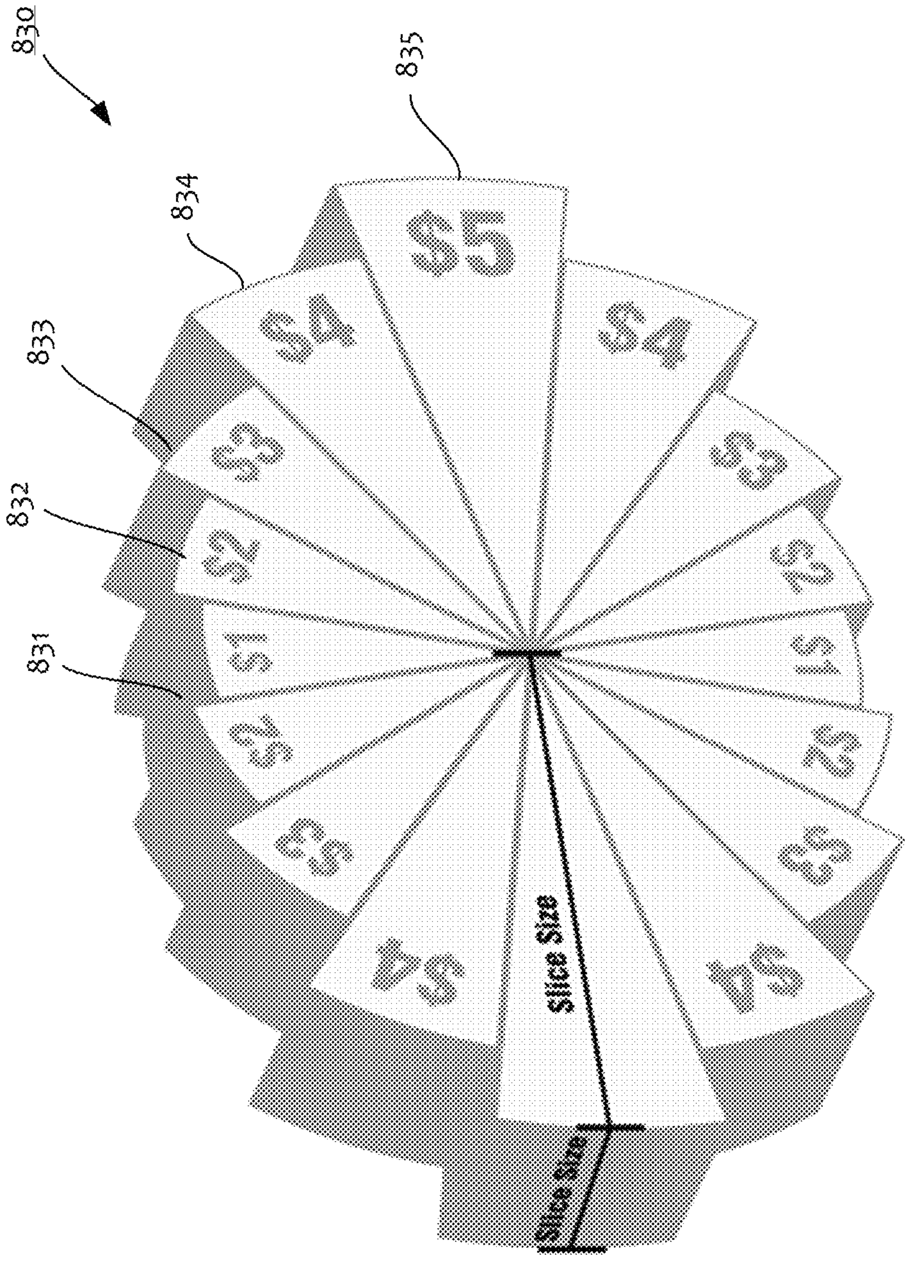
FIG. 8C illustrates a 3-dimensional feature wheel with different volumes.

FIG. 8C illustrates a 3-dimensional feature wheel 830 having a plurality of 3-dimensional slices 831, 832, 833, 834, 835 to visually convey prize sizes or values associated the 3-dimensional slices 831, 832, 833, 834, 835. In the embodiment shown, the slices are volumetric or 3-dimensional wedges measured by radii and widths. Specifically, the higher the prize value, the bigger the volume of the slice. As shown, slice 835 has an associated prize of $5, and slice 834 has an associated prize of $4. As such, the slice size controller 625*h* controls the slice 835 to be shown bigger than the slice 834.

Figure 8D:
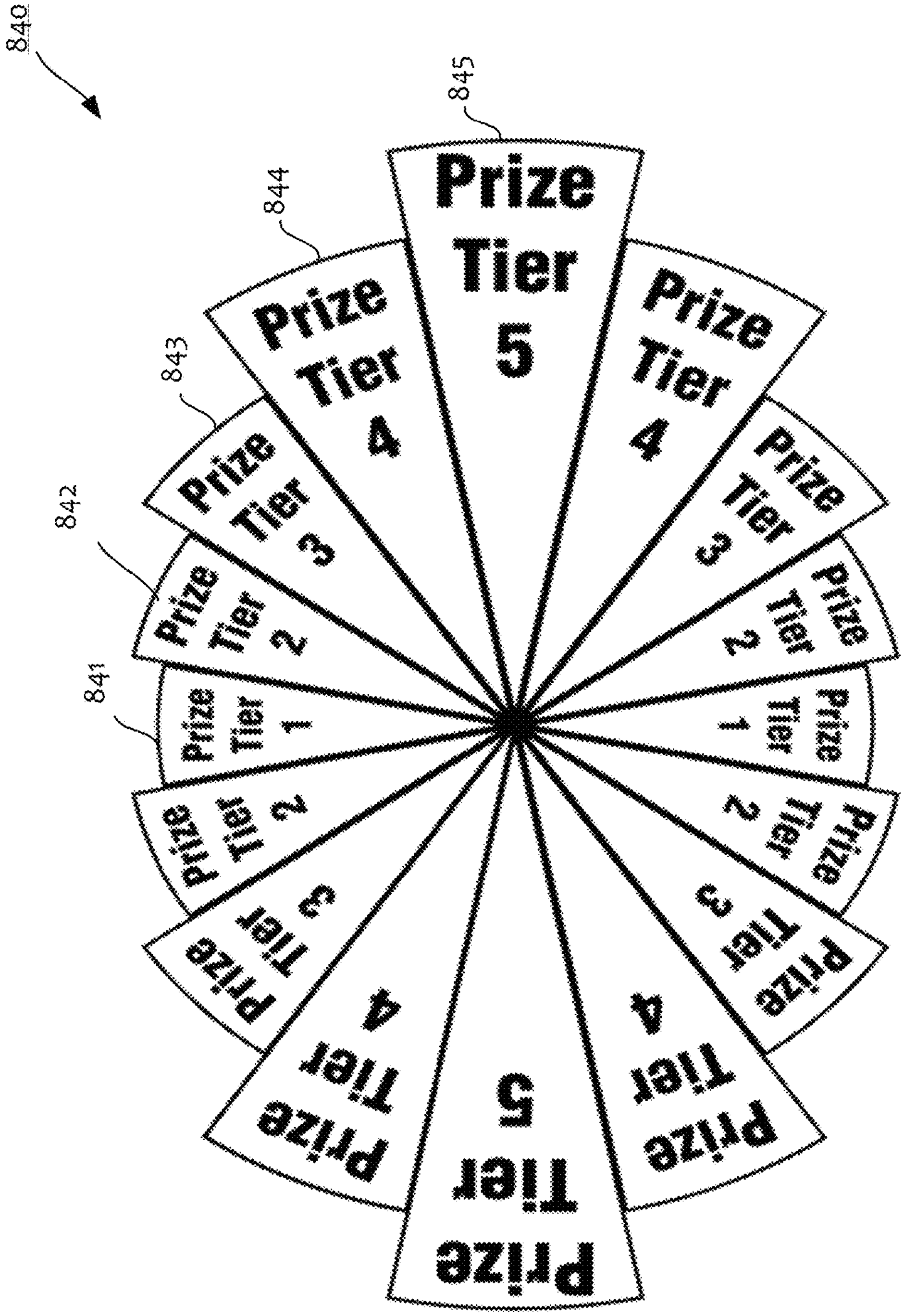
FIG. 8D illustrates a second feature wheel having a plurality of slices with different sizes.

FIG. 8D illustrates a second feature wheel 840 having a plurality of slices 841, 842, 843, 844, 845 to visually convey prize sizes or tiers associated the slices 841, 842, 843, 844, 845. In the embodiment shown, the slices are planar or 2-dimensional wedges measured by areas (or radius). Specifically, the higher the prize value, the larger the wedge area. As shown, slice 845 has an associated tier of 5, and slice 804 has an associated tier of 4. As such, the slice size controller 625*h* controls the slice 845 to be shown larger than the slice 844.

Figure 8E:
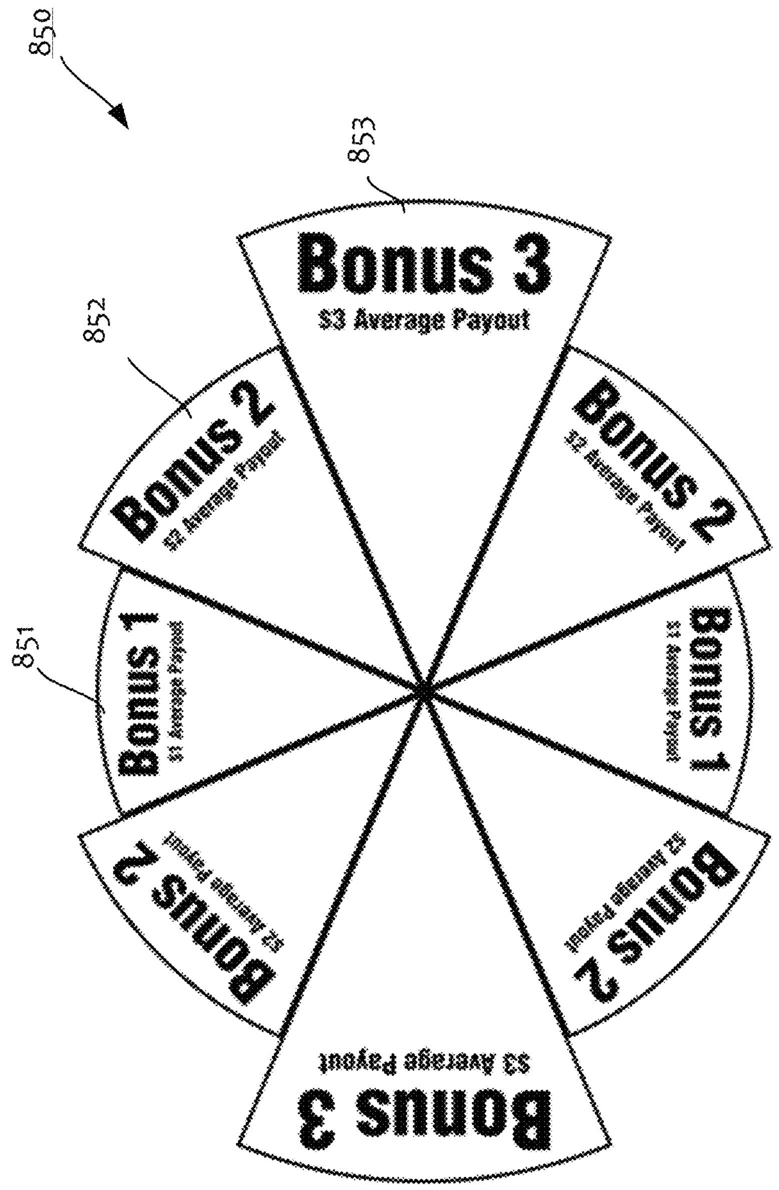
FIG. 8E illustrates a third feature wheel having a plurality of slices with different sizes.

FIG. 8E illustrates a third feature wheel 850 having a plurality of slices 851, 852, 853 to visually convey prize sizes or bonuses associated the slices 851, 852, 853. In the embodiment shown, the slices are planar or 2-dimensional wedges measured by areas (or radius). Specifically, the higher the prize value, the larger the wedge area. As shown, slice 853 has an associated bonus of "$3 Average Payout," and slice 852 has an associated bonus of "$23 Average Payout." As such, the slice size controller 625*h* controls the slice 853 to be shown larger than the slice 852.

Figure 8F:
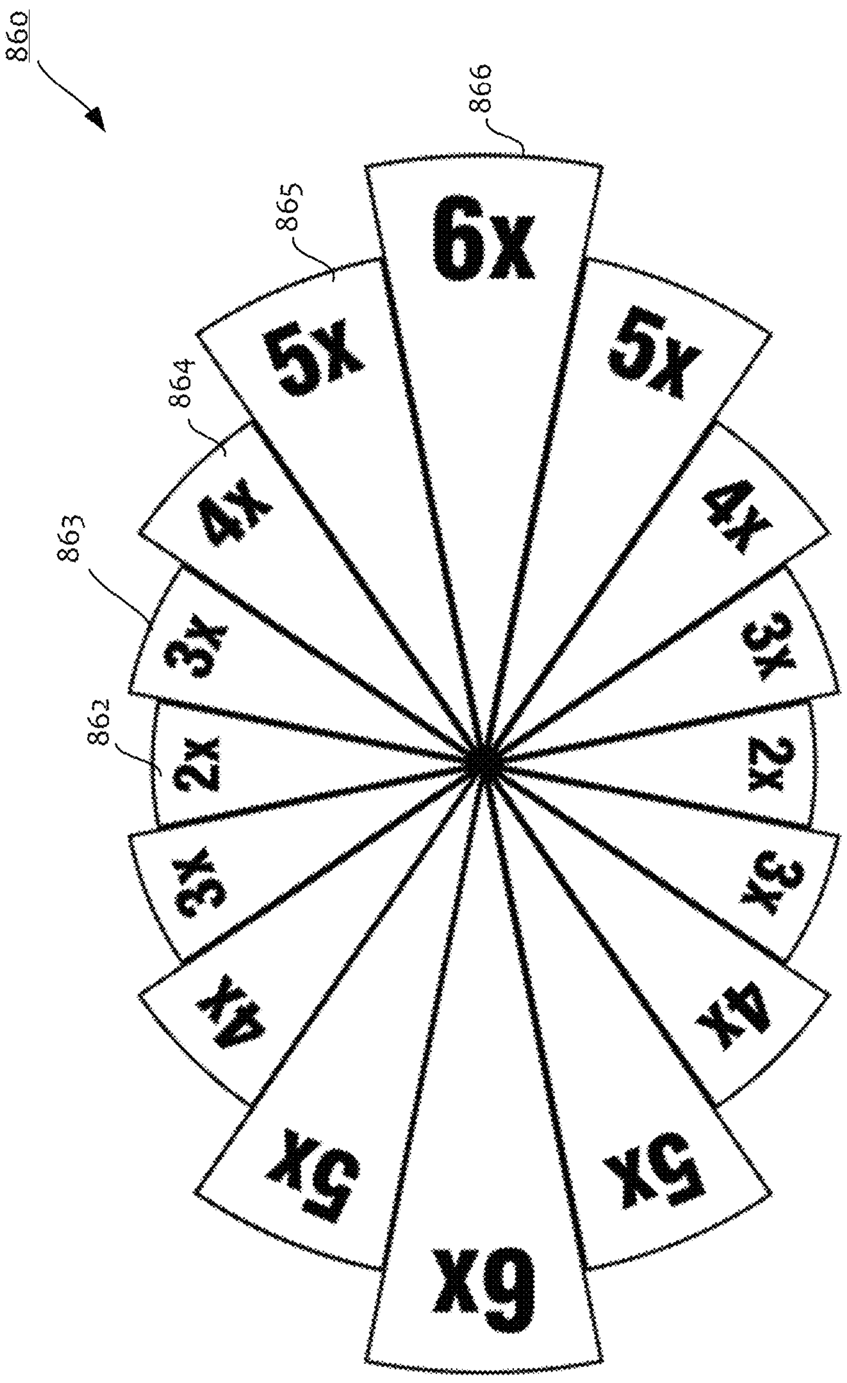
FIG. 8F illustrates a fourth feature wheel having a plurality of slices with different sizes.

FIG. 8F illustrates a fourth feature wheel 850 having a plurality of slices 862, 863, 864, 865, 866 to visually convey prize sizes or multipliers associated the slices 862, 863, 864, 865, 866. In the embodiment shown, the slices are planar or 2-dimensional wedges measured by areas (or radius). Specifically, the higher the prize value, the larger the wedge area. As shown, slice 866 has an associated multiplier of "6×," and slice 865 has an associated multiplier of "5×." As such, the slice size controller 625*h* controls the slice 866 to be shown larger than the slice 865.

Referring back to FIG. 6, the processor 62 also includes a jackpot prize controller 625*i* that manages how wagers placed by a player progressively contribute to a plurality of multi-level progressives or jackpot prizes. In some embodiments, the jackpot prizes are capped with respective thresholds. For example, when a wager is placed by a player, the jackpot prize controller 625*i* may manage contribution amounts of the placed wager to a plurality of jackpot prizes. When a jackpot prize reaches a corresponding jackpot prize cap or threshold, contribution to the jackpot prize forms an overflow, and the contribution is visually halted on the display 54. The jackpot prize controller 625*i* routes the overflow to an escrow account controller 625*j* which manages the overflows from the plurality of jackpot prizes. The escrow account controller 625*j* then routes at least a portion of the overflow to a kitty progressive jackpot, which is managed by a kitty jackpot controller 625*k*. In some embodiments, the escrow account controller 625*j* also resets a jackpot prize to a new jackpot prize based on the stored overflow for the jackpot prize.

In this regard, the kitty jackpot controller 625*k* may manage to award the kitty jackpot when any of the prize identifiers as discussed above is awarded. Specifically, when the award controller 625*f* awards a jackpot prize associated with a prize identifier on a slice, the kitty jackpot controller 625*k* manages to award also the kitty jackpot. In some embodiments, the kitty jackpot controller 625*k* manages to award the kitty jackpot when the feature wheel 700 (of FIG. 7A) is initiated, and the award controller 625*f* awards a jackpot prize associated with a prize identifier after the upgrade indicator 714 lands on a slice. Further, the kitty jackpot controller 625*k* may also manage a kitty jackpot seed value and a kitty jackpot increment. In addition, the kitty jackpot controller 625*k* increments the kitty jackpot based on overflows received from the escrow account controller 625*j*. For example, in some embodiments, when the jackpot prize controller 625*i* increments a jackpot prize based on the contribution, the kitty jackpot controller 625*k* may also increment equally the kitty jackpot. In some embodiments, however, when the jackpot prize controller 625*i* determines that a jackpot prize has been capped or reached a corresponding threshold, the jackpot prize controller 625*i* stops incrementing the jackpot prize, the kitty jackpot controller 625*k* may only increment the kitty jackpot. In other embodiments, when a trigger condition is met in a base game, the kitty jackpot controller 625*k* may also increment the kitty jackpot by a predetermined amount.

The processor 62 also includes a trigger detection controller 625*l* that detects a trigger condition or event. In some embodiments, a trigger event may include a predetermined combination of symbols having been displayed during play of a base game. For example, during play of a base game, if the display 54 displays three upgrade symbols, the trigger detection controller 625*l* triggers a progressive feature, for example, spinning of a feature wheel via the spin controller 625*b*.

Figure 9:
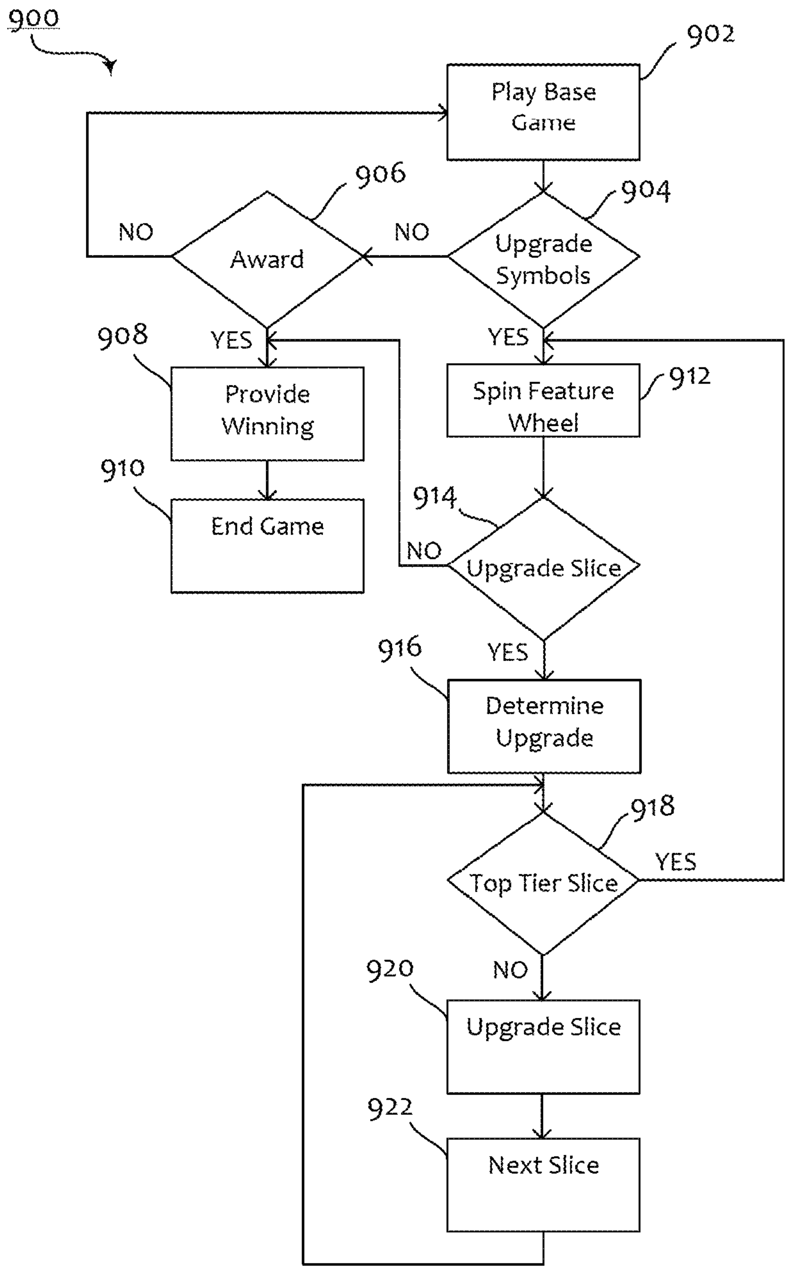
FIG. 9 illustrates a flow chart of an exemplary upgrade process.
Figure 10:
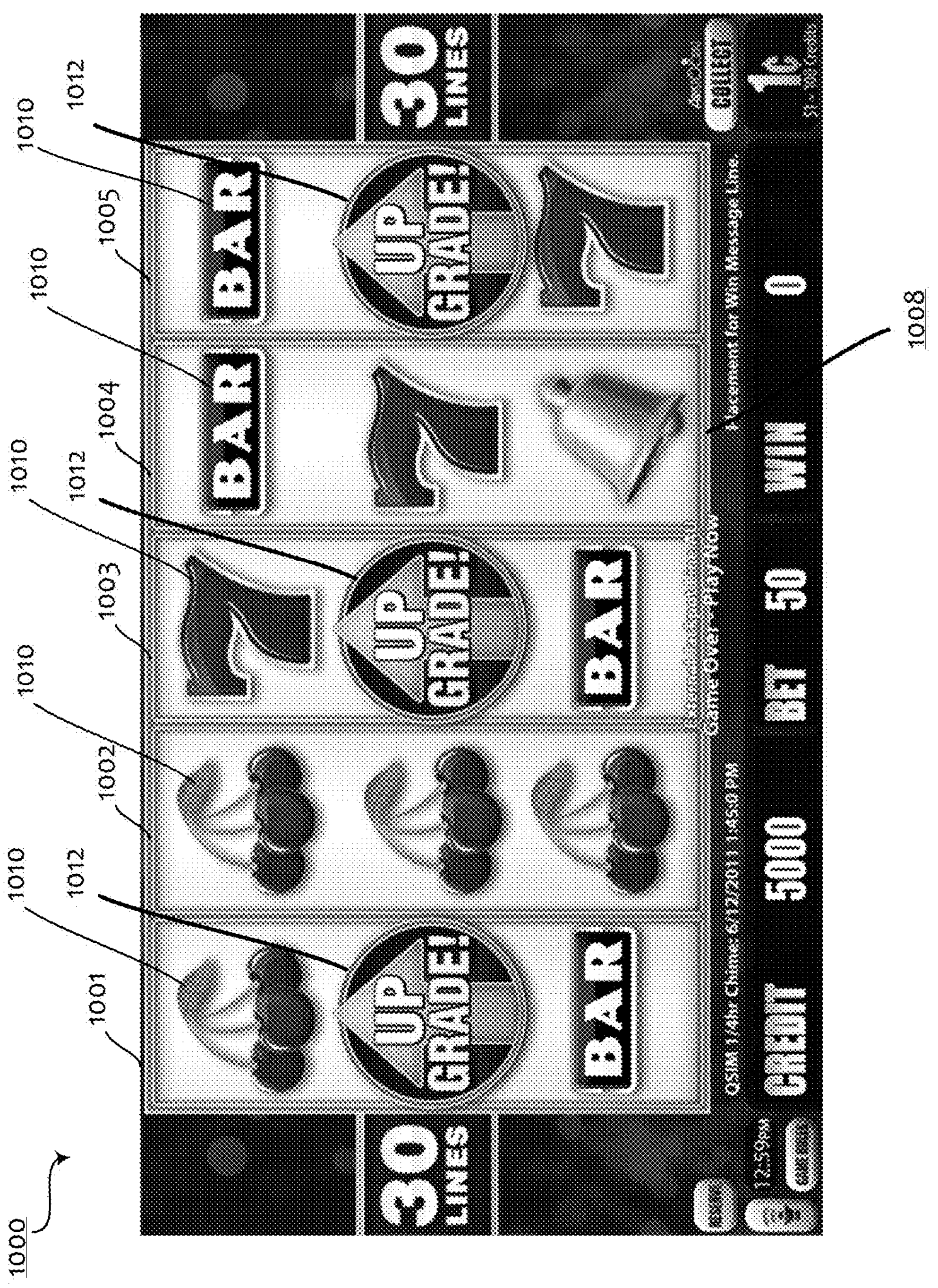
FIG. 10 illustrates an exemplary base game.

FIG. 9 illustrates a flow chart of an exemplary upgrade process 900. At block 902, a base game is played from which a feature game may be triggered. An exemplary base game 1000 is shown in FIG. 10. In some embodiments, when the credit input mechanism 52.1 (of FIG. 6) receives a physical item representing a monetary value for establishing a credit balance, the game controller 60 (of FIG. 6) may initiate a base game. The game controller 60 also selects symbols from the symbol memory module 64.1 for display. For example, the base game 1000 may have five vertically spinning reels 1001, 1002, 1003, 1004, 1005 which stop to display a 3 by 5 array 1008 of game symbols 1010. Awards are achieved based on a symbol outcome shown in the 3×5 array 1008.

The trigger detection controller 625*l* may determine if a feature game is triggered during the play of the base game 1000, by a conventional trigger event, including a particular symbol outcome in the base game 1000. For example, three special jackpot scatter symbols 1012 on reels 1001, 1003 and 1005 in the game outcome may constitute a jackpot trigger that will trigger a feature game, detailed hereinafter. Other triggers may be used together with the jackpot trigger. For example, a free spin trigger formed from a free spin scatter symbol may be used to initiate a free spin feature game. In some embodiments, the jackpot scatter symbols 1012 may be offset from the free spin scatter symbol in the base game 1000 reels so that both features cannot be triggered at the same time. In other embodiments, the jackpot scatter symbols 1012 and the free spin scatter symbol may be shown simultaneously. As shown, the jackpot scatter symbols 1012 are upgrade symbols.

Referring back to FIG. 9, at block 904, the upgrade process 900 via the trigger detection controller 625*l* of FIG.

6 determines if a plurality of upgrade symbols or a predetermined combination of upgrade symbols, such as the jackpot scatter symbols 1012 of FIG. 10, have been selected from the symbol memory module 64.1 for display, for example, in the 3×5 array 1008 in the base game 1000 (of FIG. 10). In other embodiments, additional trigger conditions may also be applied. At block 904, if the upgrade process 900 determines that the displayed symbols in the 3×5 array 1008 do not include a plurality of upgrade symbols or a predetermined combination of upgrade symbols, the upgrade process 900 proceeds to determine via the award controller **625*f* (of FIG. 6) at block 906 if other awards are to be provided. If the award controller 625*f* determines at block 906 that no award is to be provided, the upgrade process 900 returns to block 902 to continue to play the base game 1000. In other embodiments, the upgrade process 900 may proceed to end the base game 1000 at block 910. If the award controller 625*f* determines at block 906 that an award is to be provided, the upgrade process 900 may provide winnings to the meter controller 624 and the meters 54.1 (of FIG. 6), or via the payout mechanism 52.2 (of FIG. 6) at block 908, and may either end the base game 1000 at block 910, as shown, or alternatively, returns to block 902 to continue the base game 1000**.

In some embodiments, play of the jackpot feature game is directed to winning a progressive jackpot prize from a number of progressive jackpot prizes. The prizes may be progressive in nature. That is, as discussed above, in accordance with wagers made, a portion of the wagers made is contributed to increase one or more of a plurality of jackpot prizes. Alternatively, the jackpot prizes may be fixed prizes. As shown, a spinning wheel game (similar to the feature wheel 700 of FIG. 7A) is used in the feature game to randomly select one of a plurality of available jackpot prizes to be awarded.

Figure 11:
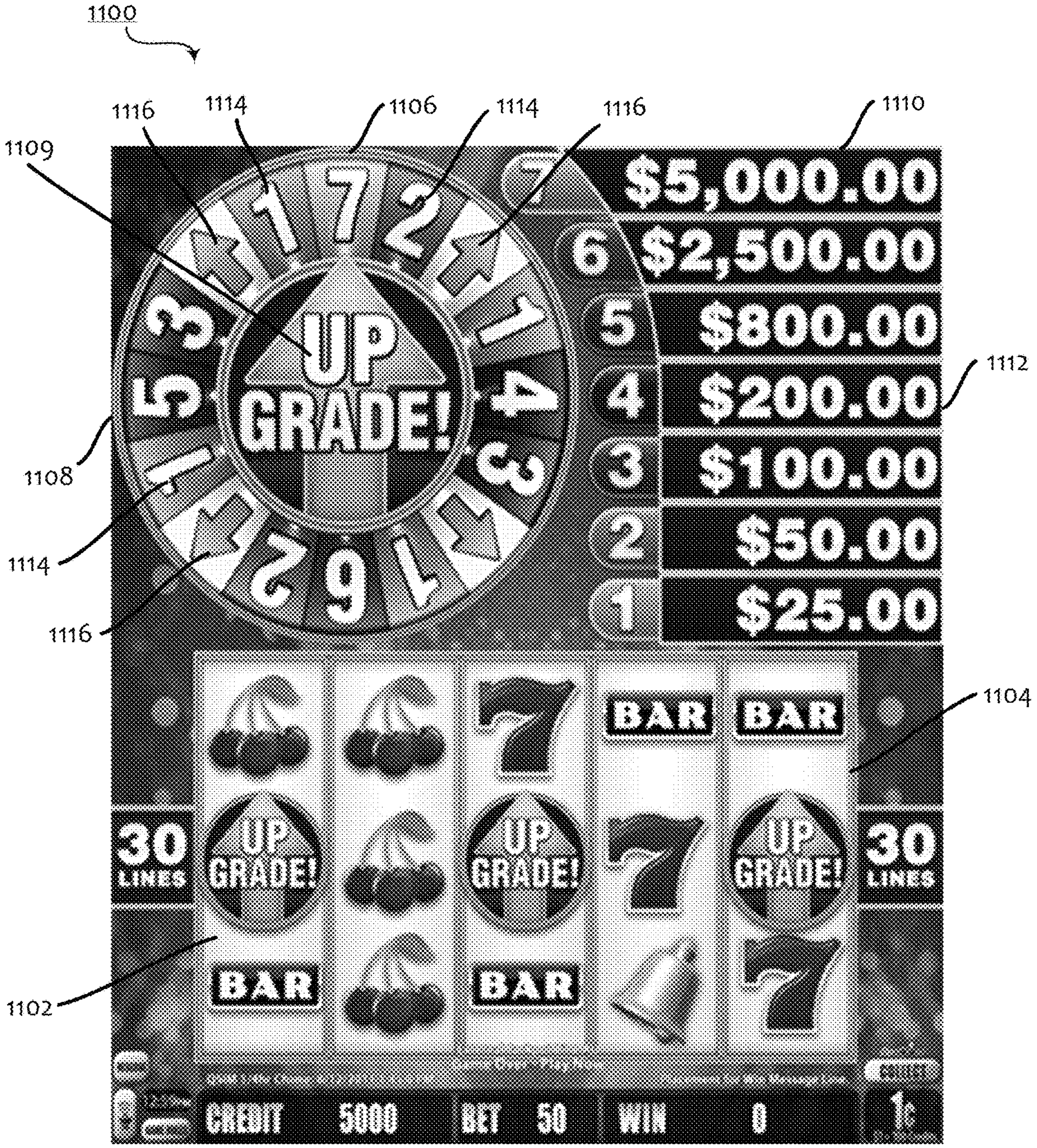
FIG. 11 illustrates an exemplary display displaying an outcome of a base game in a first display area, a jackpot chart in a second display area, and a feature wheel in a third display area.

FIG. 11 illustrates an exemplary display 1100 displaying an outcome of a base game 1102 (similar to the outcome of the base game 1000 of FIG. 10) in a first display area 1104 of the display 54 (of FIG. 6), a jackpot chart 1110 in a second display area 1112 of the display 54 (of FIG. 6), and a feature wheel 1106 with an upgrade indicator 1109 in a third display area 1108 of the display 54 (of FIG. 6). As shown, the feature wheel 1106 has a circular configuration with a plurality of "slices" (portions of the circular wheel disposed along an outer perimeter of the feature wheel 1106 and circularly stacked together around the outer perimeter). Specifically, the first display area displays the outcome of the base game 1102 in a 3×5 array, the second display area 1112 displays seven (7) different tiers of jackpot prizes in dollars and identifies the jackpot prizes by a tier number 1 through 7. The higher the tier number, the greater in value of the jackpot prize. For example, the jackpot prize associated with tier 3 is $100.00, and the jackpot prize associated with tier 4 is $200.00. Those jackpot prizes may increase in value based on, for example, play of the gaming machine 10 of FIG. 2 with associated wagers. As shown, the second display area 1112 is located above and to the right of the base game 1102 in the first display area 1104. The third display area 1108 displays the feature wheel 1106 and the upgrade indicator 1109 which is rotatable on the display 54 when the feature game is played. The feature wheel 1106 is located above and to the left of the base game on the display 54. As discussed above, sixteen (16) slices of the feature wheel 1106 are shown to a player. Each slice carries or visually shows either a number 1114 or an arrow 1116. The number on a slice is a prize identifier from one (1) to seven (7) and each prize identifier is associated with one of the seven (7) different progressive jackpot tiers shown in the second display area 1112. Also as discussed above with respect to FIG. 7A, there are initially more slices or prize identifiers identifying the tier 1 jackpots than there are slices or prize identifiers identifying the tier 7 jackpot. In such cases, the tier 1 jackpot is selected more often, where each slice has an even probability of being selected. In the embodiment shown, the feature wheel 1106 has five tier 1 slices, three tier 2 slices, two tier 3 slices, one tier 4 slice, one tier 5 slice, one tier 6 slice, one tier 7 slice, and four upgrade slices.

Referring back to FIG. 9, at block 912, the upgrade process 900 via the spin controller **625*b* of FIG. 6 causes the feature wheel 1106 to spin. At block 914, the upgrade process 900 determines, via the upgrade detection controller 625*c*, if the feature wheel 1106 has landed on an upgrade slice. If the upgrade process 900 determines that the feature wheel 1106 has not landed on an upgrade slice, that is, the feature wheel 1106 has landed on one of the tiers of the jackpot prizes, the upgrade process 900 proceeds to block 908 to provide the winnings. Thus, in some embodiments, when the feature wheel 1106 does not have any blank slices, and when the feature wheel 1106 lands on a slice with a prize identifier, the award controller 625*f* awards a jackpot prize associated with the prize identifier, and the feature game ends. However, if the upgrade process 900 determines that the feature wheel 1106 has landed on an upgrade slice, as determined in block 914, the upgrade process 900 proceeds to block 916** to determine upgrades to be applied to the prize identifiers of the remaining slices.

In the embodiment shown, the upgrade process 900 at block 916 determines that the upgrades are next available levels, and that the upgrades are applicable to all slices except for the prize identifier with the highest number, for example, tier 7 as discussed above with respect to FIG. 7A. In block 918, the upgrade process 900 determines if a slice to be upgraded is a top tier slice. If a slice to be upgraded is not a top tier slice, for example, a tier 1 slice, the upgrade process 900 upgrades the corresponding prize identifier at block 920, for example, from tier 1 to tier 2. At block 922, the upgrade process 900 moves to upgrade a next tier identifier, and returns to block 918 after an upgrading. However, if a slice to be upgraded is a top tier slice, for example, a tier 1 slice, the upgrade process 900 proceeds to block 912 to re-spin the feature wheel 1106 until a slice with a prize identifier on the feature wheel 1106 is won.

Thus, similar to the discussion above with respect to FIG. 7B, the spin controller **625*b* (of FIG. 6) controls the feature wheel 1106 to spin and stop rotating about the upgrade indicator 1109. When the upgrade detection controller 625*c* (of FIG. 6) has determined that the feature wheel 1106 has landed on an upgrade slice with an upgrade identifier (similar to the upgrade slices 708 of FIG. 7A), the upgrade increment controller 625*e* may determine an increment of one tier. As such, the slice value controller 625*g* of FIG. 6 may determine that all prize identifiers associated with lower-tiered slices with prize identifiers are upgraded by one tier as determined by the upgrade increment controller 625*e*, while keeping the prize identifier of the highest-tiered slice the same. The spin controller 625*b* then controls the feature wheel 1106** to spin again. Upgrading the prize identifiers thus improves probabilities of winning a higher-tiered progressive jackpot.

In an alternative embodiment, however, where eight progressive jackpot prizes are available, and although only seven of the progressive jackpot prizes are initially identified on the feature wheel 1106, the upgrade increment controller **625*e* of FIG. 6 may apply a one-tier increment also to the prize identifier of the highest-tiered slice. As such, slices with tier 7 prize identifiers are also upgraded to tier 8 prize identifiers. Further, a tier 8 progressive jackpot prize is also added to the jackpot chart 1110** at the time of upgrade in order to reveal to a player the amount of the tier 8 progressive jackpot prize.

In some embodiments, the amount of wagers or an ante bet placed by a player may be used to upgrade the prize identifiers. Alternatively, or an ante bet used to insert additional upgrade symbols (e.g. the upgrade symbols 1012 of FIG. 10) in the base game 1102, or additional upgrade slices (e.g. the upgraded slices 708 of FIG. 7A) in the feature wheel 1106.

Figure 12A:
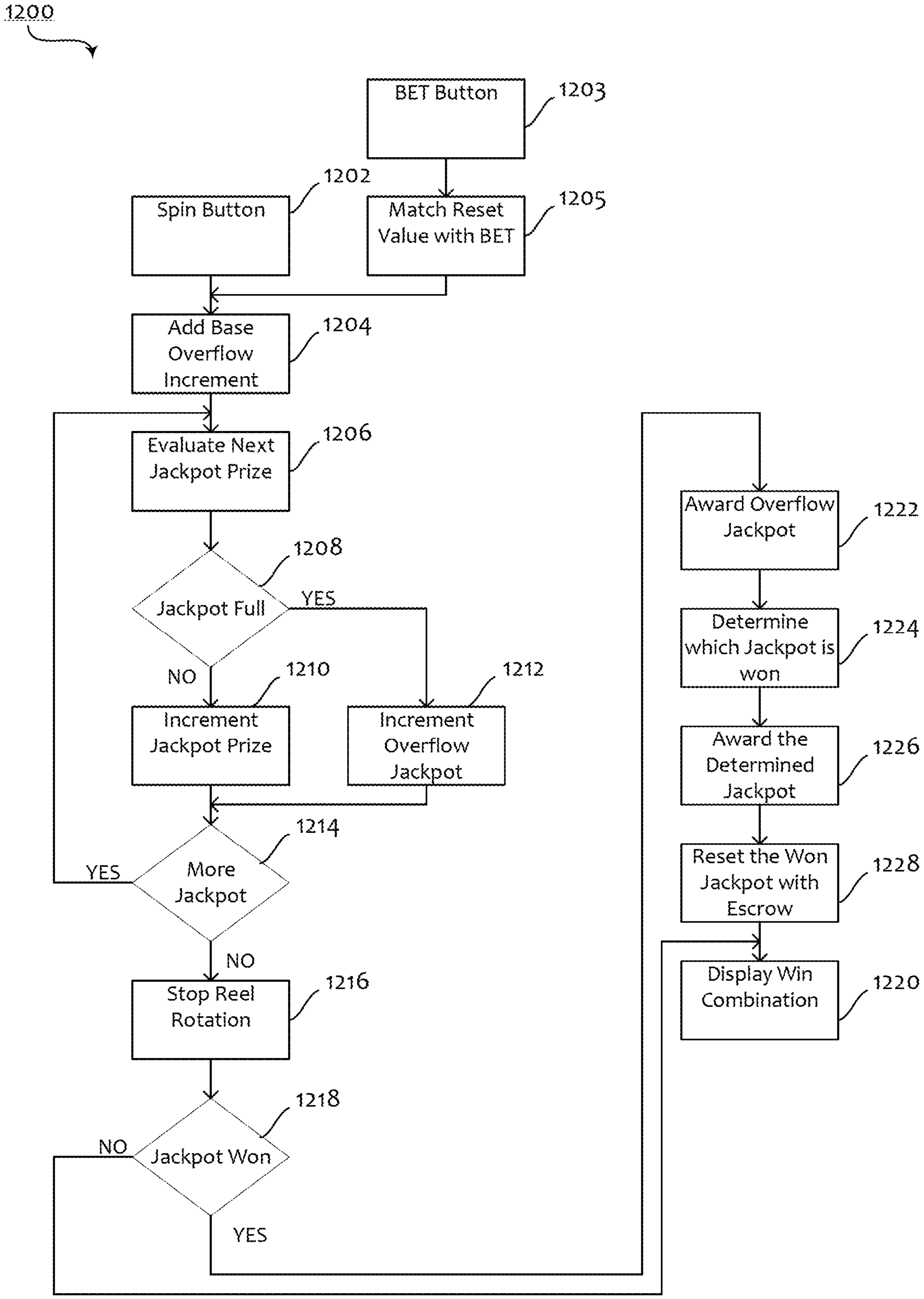
FIG. 12A illustrates a flow chart of a first exemplary progressive jackpot overflow management process.

FIG. 12A illustrates a flow chart of a first progressive jackpot overflow management process 1200. As discussed above, the jackpot prize controller 625*i* of FIG. 6 uses the first progressive jackpot overflow management process 1200 to manage how wagers placed by a player progressively contribute to a plurality of multi-level progressives or jackpot prizes. When a player wagers in a base game, a portion of the wagers are routed to a plurality of jackpot prizes. Each of the jackpot prizes, however, is generally capped at a predetermined amount or threshold. When a jackpot prize reaches a corresponding threshold, a credit that cannot be contributed to the jackpot prize because the corresponding threshold has been reached is considered an overflow.

Referring back to FIG. 12A, at block 1202, when the credit input mechanism 52.1 (of FIG. 6) receives a physical item representing a monetary value for establishing a credit balance, the game controller 60 (of FIG. 6) may initiate a base game (similar to the base game 1102 of FIG. 11) via the game play mechanism 56 (e.g., a spin button, not shown). At block 1204, the kitty jackpot controller 625*k* of FIG. 6 adds abase increment to an overflow jackpot (similar to the kitty jackpot discussed with respect to FIG. 6). However, when abet has been placed at block 1203, the first progressive jackpot overflow management process 1200 changes a reset value associated with the escrow account controller 625*j* to match the bet at block 1205, and proceeds to block 1204.

At block 1206, the jackpot prize controller 625*i* evaluates a jackpot prize (for example, one of the jackpot prizes of jackpot chart 1110 of FIG. 11). The first progressive jackpot overflow management process 1200, at block 1208, determines if the jackpot prize reaches a corresponding threshold. At block 1210, if the first progressive jackpot overflow management process 1200 at block 1208 determines that the jackpot prize has not reached a corresponding threshold, the jackpot prize controller 625*i* routes a portion of the wager to the jackpot prize. The first progressive jackpot overflow management process 1200 then determines at block 1212 if there is a jackpot prize on the jackpot chart 1110 to be evaluated. If the first progressive jackpot overflow management process 1200 determines at block 1212 that there is a jackpot prize on the jackpot chart 1110 to be evaluated, the first progressive jackpot overflow management process 1200 returns to block 1206.

If the first progressive jackpot overflow management process 1200 determines that the jackpot prize has reached a corresponding threshold at block 1208, the kitty jackpot controller 625*k* routes the portion of the wager to the overflow jackpot at block 1214, and proceeds to block 1212 to determine if there is a jackpot prize on the jackpot chart 1110 to be evaluated. Thus, a wager may make multiple contributions to the overflow jackpot when multiple jackpot prizes have reached their respective thresholds. In some embodiments, the overflow jackpot continues to increase without an upper limit.

At block 1216, the first progressive jackpot overflow management process 1200 completes or stops reel rotations, thus forming an outcome of the base game. Thereafter, the trigger detection controller 625*l* (of FIG. 6) determines if a feature game is triggered based on the outcome. In some embodiments, the feature game is the wheel feature game 1106 as disclosed in FIG. 11. In other embodiments, the feature game is any multi-level progressive jackpot feature game.

Figure 13:
FIG. 13 illustrates a second exemplary display displaying an outcome of a base game in a first display area, and an upgrade feature wheel in a second display area.

FIG. 13 illustrates a second exemplary display 1300 displaying an outcome of a base game 1302 (similar to the outcome of the base game 1000 of FIG. 10) in a first display area 1304 of the display 54 (of FIG. 6), and an upgrade feature wheel 1306 in a second display area 1308 of the display 54 (of FIG. 6). As shown, the upgrade feature wheel 1306 includes a plurality of upgrade slices 1310, a plurality of prize identifying slices 1312, 1314, 1316, 1318, 1320, 1322, 1324, 1326, and a hub 1328 displaying an amount accumulated in the overflow jackpot. Each of prize identifying slices 1312, 1314, 1316, 1318, 1320, 1322, 1324, 1326 identifies a prize associated with the respective slice. For example, slice 1312 has a prize identifier identifying a $25 jackpot prize, and slice 1324 has a prize identifier identifying a $5000 jackpot prize. As shown, the overflow jackpot has a value of $60. As discussed above, the upgrade slice 1310 upgrades the prize identifying slices 1312, 1314, 1316, 1318, 1320, 1322, 1324, 1326 when the upgrade feature wheel 1306 lands on the upgrade slice 1310. However, other multi-level progressive jackpot feature game may also be used as a feature game. For example, the wheel feature 1106 with the jackpot chart 1110, of FIG. 11 may be used as a feature game. In such cases, the overflow jackpot may be displayed separately from the feature wheel 1306. In the embodiment shown, the slices 1322, 1328, 1330 also indicate that the respective associated prizes have been capped or reached their respective thresholds, with cap indicators "max" 1332.

Referring again to FIG. 12A, at block 1218, the first progressive jackpot overflow management process 1200 determines from the outcome of the wheel feature 1306 if a jackpot prize has been won. At block 1220, if a jackpot prize has not been won as determined at block 1218, the first progressive jackpot overflow management process 1200 controls the display 54 (of FIG. 6) to display winning combinations or winning lines of the base game 1302, and optionally some winning celebrations. At block 1222, if a jackpot prize has been won as determined at block 1218, the kitty jackpot controller 625*k* awards the overflow jackpot shown in the hub 1328. At block 1224, the first progressive jackpot overflow management process 1200 determines which one jackpot prize of the plurality of jackpot prizes has been won. The first progressive jackpot overflow management process 1200 awards the won one jackpot prize via the award controller 625*f* at block 1226, and resets the jackpot prize of the won one jackpot prize with values from the escrow account controller 625*j* at block 1228. Similarly, in some embodiments, the award controller 625*f* also resets the overflow jackpot when the overflow jackpot is awarded at block 1228.

Figure 12B:
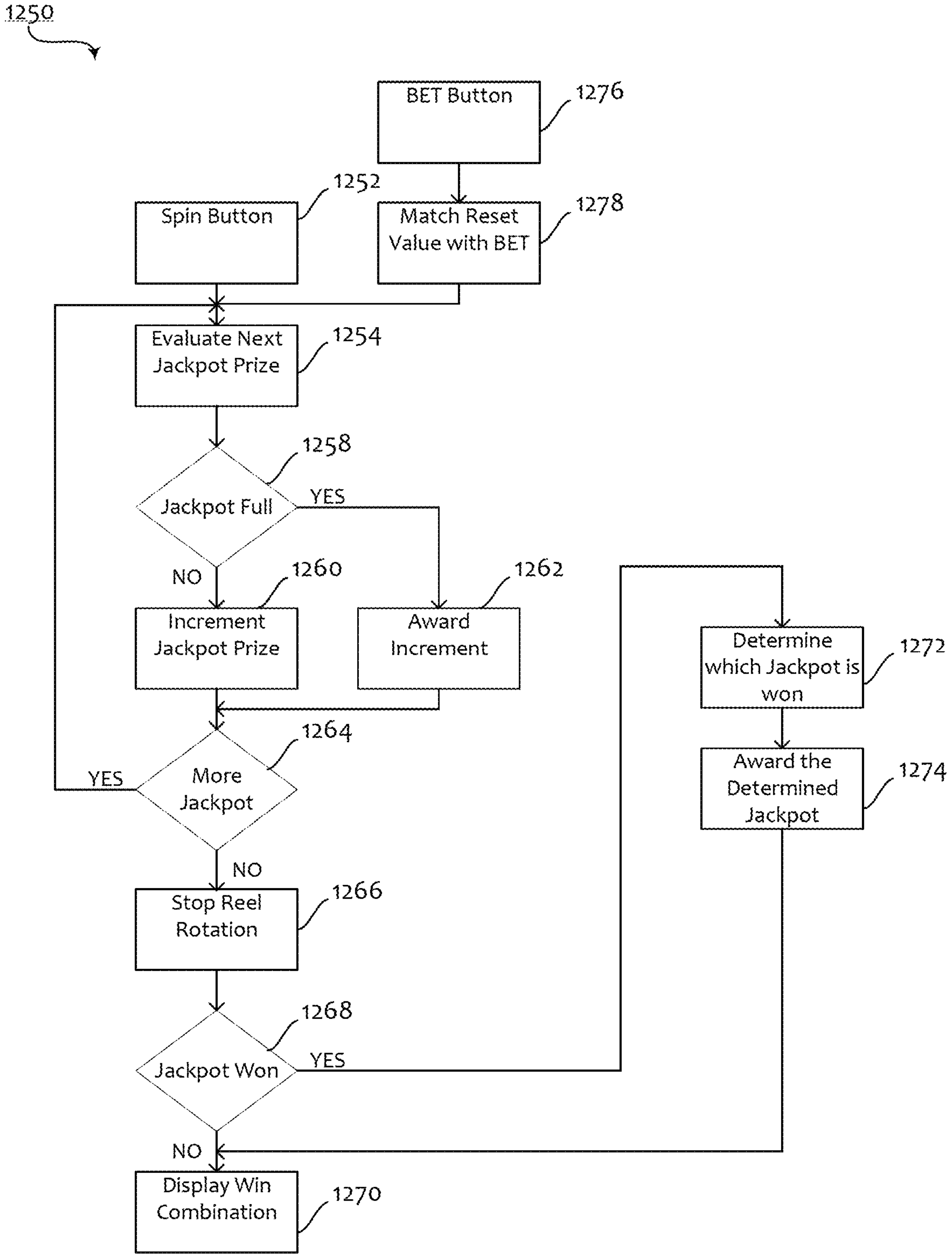
FIG. 12B illustrates a flow chart of a second progressive jackpot overflow management process.

FIG. 12B illustrates a flow chart of a second progressive jackpot overflow management process 1250. Similar to the first progressive jackpot overflow management process 1200, the second progressive jackpot overflow management process 1250 returns overflow increments directly or indirectly to a player as an overflow jackpot or prize. In some embodiments, the second progressive jackpot overflow management process 1250 returns the overflow increments with celebration or during a time when the time/counter 623 has determined that the player has not received any award for a predetermined duration. When a player wagers in a base game, a portion of the wagers are routed to a plurality of jackpot prizes. Each of the jackpot prizes, however, is generally capped at a predetermined amount or threshold. When a jackpot prize reaches a corresponding threshold, a credit that cannot be contributed to the jackpot prize because the corresponding threshold has been reached is considered an overflow.

During play of a base game with multi-level progressive jackpots, the jackpot prize controller **625*i* evaluates each of the progressive jackpots to determine whether each of the progressive jackpots has already been capped. If the jackpot prize controller 625*i* determines that a progressive jackpot has been capped or has reached a corresponding threshold, the kitty jackpot controller 625*k* accumulates the overflow increments. In some embodiments, the accumulation is displayed on display 54. For example, after an amount of increment has been accumulated, the award controller 625*f* directly awards the amount of the overflow increments as an overflow jackpot or prize. In other embodiments, after the accumulation, the award controller 625*f* indirectly awards the amount of the overflow increments, for example, via the kitty jackpot controller 625*k***. Other exemplary ways of awarding the overflow increments include, for example, but not limited to, a consolation prize for a subsequent non-winning game, adding the overflow increments to an award for a winning spin, and finding a specified element or elements during a pick bonus.

Referring back to FIG. 12B, at block 1252, when the credit input mechanism 52.1 (of FIG. 6) receives a physical item representing a monetary value for establishing a credit balance, the game controller 60 (of FIG. 6) may initiate a base game (similar to the base game 1102 of FIG. 11) via the game play mechanism 56 (e.g., a spin button, not shown). When a bet has been placed at block 1276, the second progressive jackpot overflow management process 1250 changes a reset value associated with the escrow account controller **625*j* to match the bet at block 1278, and proceeds to block 1254**.

At block 1254, the jackpot prize controller **625*i* evaluates a jackpot prize (for example, one of the jackpot prizes of jackpot chart 1110 of FIG. 11). The second progressive jackpot overflow management process 1250, at block 1258, determines if the jackpot prize reaches a corresponding threshold. At block 1258, if the second progressive jackpot overflow management process 1250 determines that the jackpot prize has not reached a corresponding threshold, the jackpot prize controller 625*i* routes a portion of the wager to the overflow jackpot or prize at block 1260. The second progressive jackpot overflow management process 1250 then determines at block 1264 if there is another jackpot prize on the jackpot chart 1110 to be evaluated. If the second progressive jackpot overflow management process 1250 determines at block 1264 that there is another jackpot prize on the jackpot chart 1110 to be evaluated, the second progressive jackpot overflow management process 1250 returns to block 1254**.

If the second progressive jackpot overflow management process 1250 determines that the jackpot prize has reached a corresponding threshold at block 1258, the award controller **625*f* routes the portion of the wager to be awarded, directly or indirectly as discussed above, at block 1262, and proceeds to block 1264 to determine if there is another jackpot on the jackpot chart 1110** to be evaluated. Thus, a wager may make multiple contributions to different jackpots when multiple jackpot prizes have reached their respective thresholds. In some embodiments, the overflow jackpot continues to increase without an upper limit.

At block 1266, the second progressive jackpot overflow management process 1250 completes or stops reel rotations, thus forming an outcome of the base game. Thereafter, the trigger detection controller **625*l* (of FIG. 6) determines if a feature game is triggered based on the outcome. In some embodiments, the feature game is the wheel feature game 1106 as disclosed in FIG. 13**. In other embodiments, the feature game is any multi-level progressive jackpot feature game.

Referring again to FIG. 12B, at block 1268, the second progressive jackpot overflow management process 1250 determines, for example, from the outcome of the wheel feature 1306 if a jackpot prize has been won. At block 1270, if a jackpot prize has not been won as determined at block 1268, the second progressive jackpot overflow management process 1250 controls the display 54 (of FIG. 6) to display winning combinations or winning lines of the base game 1302, and awards the overflow jackpot, with optionally some winning celebrations.

At block 1272, if a jackpot prize has been won as determined at block 1268, the second progressive jackpot overflow management process 1250 determines which one jackpot prize of the plurality of jackpot prizes has been won. The second progressive jackpot overflow management process 1250 awards the won one jackpot prize via the award controller **625*f* at block 1274**.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the invention. In particular, it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

What is claimed is:

1. An electronic gaming system comprising:
- a server having a plurality of prizes with respective prize thresholds, and an overflow prize; and
- a client gaming device, remotely coupled to the server, the client gaming device comprising a processor and a memory, the memory storing a symbol set including a plurality of feature symbols, and a plurality of instructions, which, when executed, cause the processor to, at least:
  - receive data indicative of the plurality of prizes and the overflow prize,
  - cause the client gaming device to animate the plurality of prizes and the overflow prize,
  - cause the client gaming device to animate a first prize being increased in response to a wager being placed,
  - cause the client gaming device to animate the overflow prize being increased to a different overflow prize in response to the first prize having reached a first prize threshold associated with the first prize, and
  - cause the client gaming device to generate a win based on the different overflow prize in response to the first prize and a second prize not being awarded.

2. The electronic gaming system of claim 1, wherein executing the instructions further causes the client gaming device to animate the first prize being updated in response to the first prize not having reached the first prize threshold.

3. The electronic gaming system of claim 1, wherein executing the instructions further causes the processor to determine an overflow to be added to the overflow prize in response to the first prize having reached the first prize threshold.

4. The electronic gaming system of claim 1, wherein executing the instructions further causes the client gaming device to animate the first prize being incremented in response to the first prize not having reached the first prize threshold.

5. The electronic gaming system of claim 4, wherein executing the instructions further causes the client gaming device to halt incrementing the first prize in response to the first prize having reached the first prize threshold.

6. The electronic gaming system of claim 1, wherein executing the instructions further causes the processor to determine if a predetermined symbol is displayed in response to determining that the first prize and the second prize are not to be awarded to display the win based on the different overflow prize.

7. The electronic gaming system of claim 1, wherein executing the instructions further causes the client gaming device to animate the overflow prize differently in response to the first prize not having reached the first prize threshold.

8. A method of upgrading prizes awarded by an electronic gaming system having a client gaming device, the method comprising:
- transmitting, from a server to the client gaming device, data indicative of a plurality of prizes and an overflow prize;
- controlling the client gaming device to animate the plurality of prizes and the overflow prize;
- controlling the client gaming device to visually increase a first prize in response to a wager being placed;
- controlling the client gaming device to increase the overflow prize visually to a different overflow prize in response to the first prize having reached a first prize threshold associated with the first prize; and
- controlling the client gaming device to generate a win based on the different overflow prize in response to the first prize and a second prize not being awarded.

9. The method of claim 8, further comprising visually updating the first prize in response to the first prize not having reached the first prize threshold.

10. The method of claim 9, further comprising determining an overflow to be added to the overflow prize in response to the first prize having reached the first prize threshold.

11. The method of claim 9, further comprising visually increasing the first prize in response to the first prize not having reached the first prize threshold.

12. The method of claim 11, further comprising halting animating the first prize being increased in response to the first prize having reached the first prize threshold.

13. The method of claim 8, further comprising determining if a predetermined symbol is displayed in response to determining that the first prize and the second prize are not to be awarded to display the win based on the different overflow prize.

14. The method of claim 8, further comprising animating the overflow prize differently in response to the first prize not having reached the first prize threshold.

15. A non-transitory computer-readable medium comprising instructions in a remote gaming device that comprises a processor, and the instructions, which, when executed, cause the processor to perform the steps of:
- receiving data indicative of a plurality of prizes and an overflow prize from a server;
- animating on the remote gaming device the plurality of prizes and the overflow prize;
- animating on the remote gaming device a first prize being increased in response to a wager being placed;
- animating on the remote gaming device the overflow prize being increased to a different overflow prize in response to the first prize having reached a first prize threshold associated with the first prize; and
- determining at the remote gaming device a win based on the different overflow prize in response to the first prize and a second prize not being awarded.

16. The non-transitory computer-readable medium of claim 15, wherein executing the instructions further causes the remote gaming device to perform the step of animating the first prize being updated in response to the first prize not having reached the first prize threshold.

17. The non-transitory computer-readable medium of claim 15, wherein executing the instructions further causes the remote gaming device to perform the step of determining an overflow to be added to the overflow prize in response to the first prize having reached the first prize threshold.

18. The non-transitory computer-readable medium of claim 15, wherein executing the instructions further causes the remote gaming device to perform the step of animating the first prize being incremented in response to the first prize not having reached the first prize threshold.

19. The non-transitory computer-readable medium of claim 15, wherein executing the instructions further causes the remote gaming device to perform the step of determining if a predetermined symbol is displayed in response to determining that the first prize and the second prize are not to be awarded to display the win based on the different overflow prize.

20. The non-transitory computer-readable medium of claim 15, wherein executing the instructions further causes the remote gaming device to perform the step of animating the overflow prize differently in response to the first prize not having reached the first prize threshold.

* * * * *